US012738533B2

(12) United States Patent
Takano

(10) Patent No.: US 12,738,533 B2
(45) Date of Patent: Sep. 15, 2026

(54) SOLID ELECTROLYTE CERAMIC AND SOLID-STATE BATTERY

(71) Applicant: Murata Manufacturing Co., Ltd., Nagaokakyo (JP)

(72) Inventor: Ryohei Takano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 617 days.

(21) Appl. No.: 18/317,751

(22) Filed: May 15, 2023

(65) Prior Publication Data

US 2023/0307705 A1 Sep. 28, 2023

Related U.S. Application Data

(63) Continuation of application No. PCT/JP2021/042283, filed on Nov. 17, 2021.

(30) Foreign Application Priority Data

Nov. 17, 2020 (JP) ................................ 2020-191136

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0071* (2013.01)

(58) Field of Classification Search
CPC ................................................ H01M 10/0562
See application file for complete search history.

(56) References Cited

U.S. PATENT DOCUMENTS 10,854,930 B2 * 12/2020 Sakamoto ......... H01M 10/4235
2014/0186720 A1 * 7/2014 Kintaka ............... C01G 25/006 429/322
2016/0329598 A1 11/2016 Schneider et al.
2017/0222254 A1 8/2017 Sakamoto et al.
2018/0102571 A1 4/2018 Sakamoto et al.
2020/0127326 A1 4/2020 Yokoyama
2022/0294000 A1 * 9/2022 Ying .................... C01G 25/006
2023/0076099 A1 * 3/2023 Takano ................... H01M 4/62
2023/0291008 A1 * 9/2023 Takara ............. H01M 10/0525

(Continued)

FOREIGN PATENT DOCUMENTS

JP 2015050071 A 3/2015
JP 2017511781 A 4/2017
JP 2017091953 A 5/2017

(Continued)

OTHER PUBLICATIONS

Gao et al., "Synthesis, ionic conductivity, and chemical compatibility of garnet-like lithium ionic conductor Li5La3Bi2O12," Solid State Ionics, 2010, vol. 181, pp. 1415-1419.

(Continued)

*Primary Examiner* — Amanda C. Walke
(74) *Attorney, Agent, or Firm* — ArentFox Schiff LLP

(57) ABSTRACT

A solid electrolyte ceramic containing: at least lithium (Li), lanthanum (La), bismuth (Bi), and oxygen (O) and having a garnet-type crystal structure; and one or more transition metal elements selected from the group consisting of cobalt (Co), nickel (Ni), and manganese (Mn).

17 Claims, 1 Drawing Sheet

(56) References Cited

U.S. PATENT DOCUMENTS

| | | | | |
|---|---|---|---|---|
| 2025/0070237 | A1* | 2/2025 | Takara | C01G 51/00 |

FOREIGN PATENT DOCUMENTS

| | | | | | |
|---|---|---|---|---|---|
| JP | 2019006634 | A | * | 1/2019 | |
| JP | 2019507473 | A | | 3/2019 | |
| JP | 2019530963 | A | | 10/2019 | |
| JP | 2020068076 | A | | 4/2020 | |
| WO | WO-2020251476 | A1 | * | 12/2020 | H01M 10/056 |

OTHER PUBLICATIONS

International Search Report in PCT/JP2021/042283, mailed Jan. 25, 2022, 3 pages.

* cited by examiner

SOLID ELECTROLYTE CERAMIC AND SOLID-STATE BATTERY

CROSS REFERENCE TO RELATED APPLICATIONS

The present application is a continuation of International application No. PCT/JP2021/042283, filed Nov. 17, 2021, which claims priority to Japanese Patent Application No. 2020-191136, filed Nov. 17, 2020, the entire contents of each of which are incorporated herein by reference.

FIELD OF THE INVENTION

The present invention relates to a solid electrolyte ceramic and a solid-state battery containing the solid electrolyte ceramic.

BACKGROUND OF THE INVENTION

In recent years, the demand for batteries has been greatly expanded as power supplies for portable electronic devices such as mobile phones and portable personal computers. As battery used for such an application, development of a sintered-type solid-state secondary battery (so-called "solid-state battery") in which a solid electrolyte is used as an electrolyte and other constituent elements are also composed of a solid has been advanced.

The solid-state battery includes a positive electrode layer, a negative electrode layer, and a solid electrolyte layer stacked between the positive electrode layer and the negative electrode layer. In particular, the solid electrolyte layer contains a solid electrolyte ceramic, and is responsible for conduction of ions between the positive electrode layer and the negative electrode layer. The solid electrolyte ceramic is required to have higher ionic conductivity and lower electron conductivity. As such a solid electrolyte ceramic, attempts have been made to use a ceramic obtained by sintering a garnet-type solid electrolyte substituted with Bi from the viewpoint of higher ionic conductivity (for example, Patent Document 1 and Non-Patent Document 1).

Patent Document 1: Japanese Patent Application Laid-Open No. 2015-050071

Non-Patent Document 1: Gao et al., SolidState Ionics, 181 (2010) 1415-1419

SUMMARY OF THE INVENTION

The inventor of the present invention has found that the following problems occur in a solid-state battery using the conventional solid electrolyte ceramic as described above. Specifically, in a conventional solid-state battery using a garnet-type solid electrolyte ceramic containing Bi, impurities such as a Li—Bi—O-based compound are likely to be generated at a grain boundary, and this Li—Bi—O-based compound is reduced during operation of the solid-state battery (that is, during charging and discharging), and the electron conductivity is increased. When the electron conductivity is increased, a phenomenon that the solid-state battery is short-circuited may occur and/or a leakage current may increase.

An object of the present invention is to provide a solid electrolyte ceramic that more sufficiently suppresses an increase in electron conductivity due to operation of a solid-state battery while having excellent ion conductivity.

The present invention relates to a solid electrolyte ceramic containing: at least lithium (Li), lanthanum (La), bismuth (Bi), and oxygen (O) and having a garnet-type crystal structure; and one or more transition metal elements selected from the group consisting of cobalt (Co), nickel (Ni), and manganese (Mn).

The solid electrolyte ceramic of the present invention more sufficiently suppresses an increase in electron conductivity due to operation of a solid-state battery while having excellent ion conductivity.

DETAILED DESCRIPTION OF THE INVENTION

[Solid Electrolyte Ceramic]

Figure 1:
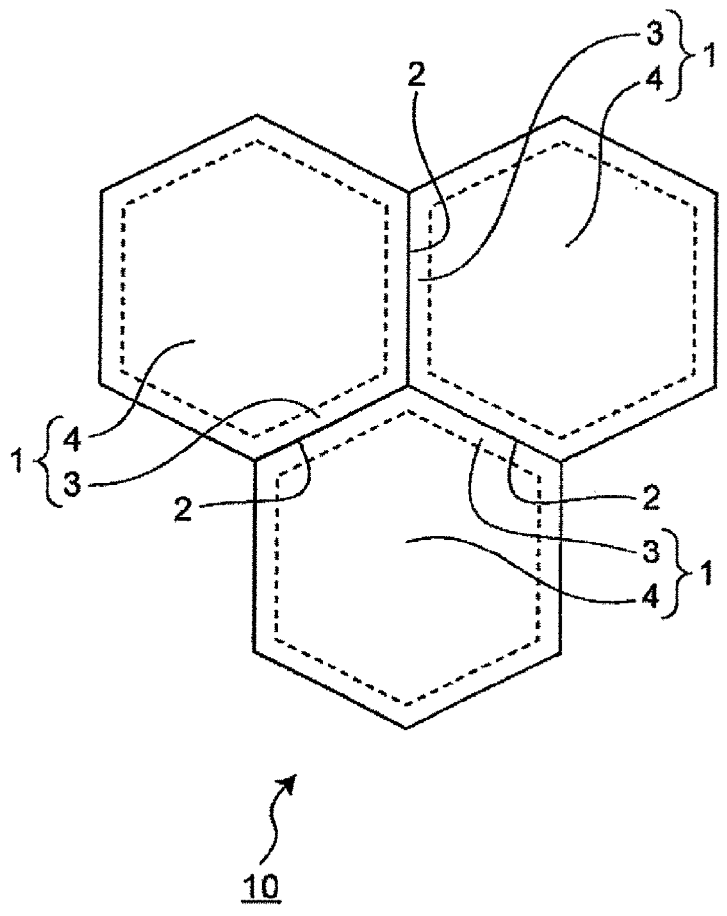
FIG. 1 is an enlarged schematic view of a solid electrolyte ceramic of the present invention for explaining a sintered grain constituting an example of the solid electrolyte ceramic and the structure thereof.

A solid electrolyte ceramic of the present invention includes a sintered body formed by sintering solid electrolyte particles. The solid electrolyte ceramic of the present invention is a solid electrolyte ceramic containing at least lithium (Li), lanthanum (La), bismuth (Bi), and oxygen (O) and having a garnet-type crystal structure; and one or more transition metal elements (hereinafter, simply referred to as "predetermined transition metal element" in some cases) selected from the group consisting of cobalt (Co), nickel (Ni), and manganese (Mn). In the present invention, the solid electrolyte ceramic containing lithium (Li), lanthanum (La), bismuth (Bi), and oxygen (O) and having a garnet-type crystal structure along with the predetermined transition metal element sufficiently suppresses an increase in electron conductivity while having excellent ion conductivity. When such a solid electrolyte ceramic does not contain the predetermined transition metal element, an increase in electron conductivity cannot be sufficiently suppressed. The solid electrolyte ceramic of the present invention may contain other composite oxides or single oxides as long as the effect of the present invention is not impaired. At least sintered grains contained in the solid electrolyte ceramic as a main component of the present invention may have a garnet-type crystal structure.

The existence form (or contained form) of the predetermined transition metal element in the solid electrolyte ceramic of the present invention is not particularly limited, and the predetermined transition metal element may exist in a crystal lattice or may exist other than the crystal lattice. For example, the predetermined transition metal element may be present in the bulk, at the grain boundary, or in both of them in the solid electrolyte ceramic. As an example in which the predetermined transition metal element is present in the bulk, in the solid electrolyte ceramic of the present invention, the predetermined transition metal element may be present at a metal site (lattice site) constituting a garnet-type crystal structure. The metal site may be any metal site, and may be, for example, a Li site, a La site, a Bi site, or two or more kinds of these sites. The solid electrolyte ceramic of the present invention includes a plurality of sintered grains, and the predetermined transition metal element may be present at an interface between two or more sintered grains.

The existence form (or contained form) of bismuth (Bi) in the solid electrolyte ceramic of the present invention is not particularly, and for example, the predetermined bismuth (Bi) may be present in the bulk, at the grain boundary, or in both of them in the solid electrolyte ceramic. From the viewpoint of insulating properties, Bi is preferably present in the bulk. As an example in which Bi is present in the bulk, in the solid electrolyte ceramic of the present invention, the Bi may be present at a metal site (lattice site) constituting a garnet-type crystal structure. Bi may be present in the sintered grains in the solid electrolyte ceramic of the present invention, or may be present on the surface thereof.

In the present invention, the predetermined transition metal and/or bismuth (Bi) may be contained in a ceramic having a garnet-type crystal structure. The predetermined transition metal and/or bismuth (Bi) may exist as a single oxide of the predetermined transition metal and/or bismuth (Bi). The predetermined transition metal and/or bismuth (Bi) may exist as a composite oxide containing an element constituting the solid electrolyte ceramic. The oxide may be present at the interface between the sintered grains of the ceramic having a garnet-type crystal structure as a main component of the present invention.

Each of lithium (Li) and lanthanum (La) in the solid electrolyte ceramic of the present invention may be usually present in the bulk, and specifically, as an example, in the solid electrolyte ceramic of the present invention, each of lithium (Li) and lanthanum (La) may be present at a Li site and a La site as metal sites (lattice sites) constituting a garnet-type crystal structure. At this time, some of lithium (Li) and lanthanum (La) may be present at a grain boundary as independent or composite oxides.

The transition metal element contained in the solid electrolyte ceramic of the present invention preferably includes Co from the viewpoint of more sufficient suppression of an increase in electron conductivity.

The solid electrolyte ceramic of the present invention preferably has a chemical composition represented by the following Formula (I), and at this time, the solid electrolyte ceramic further contains the predetermined transition metal element in the form described above.

$$A_{\alpha}B_{\beta}D_{\gamma}O_{\omega} \quad (1)$$

In Formula (I), A is one or more elements selected from the group consisting of lithium (Li), gallium (Ga), aluminum (Al), magnesium (Mg), zinc (Zn), and scandium (Sc), and includes at least lithium (Li).

B is one or more elements selected from the group consisting of lanthanum (La), calcium (Ca), strontium (Sr), barium (Ba), and lanthanoid elements, and includes at least lanthanum (La). Examples of the lanthanoid elements include cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

D is one or more elements selected from the group consisting of a transition element capable of providing six-coordination with oxygen and a typical element belonging to Groups 12 to 15. Examples of the transition element capable of providing six-coordination with oxygen include scandium (Sc), zirconium (Zr), titanium (Ti), tantalum (Ta), niobium (Nb), hafnium (Hf), molybdenum (Mo), tungsten (W), and tellurium (Te)). Examples of the typical element belonging to Groups 12 to 15 include indium (In), germanium (Ge), tin (Sn), lead (Pb), antimony (Sb), and bismuth (Bi). D includes at least Bi.

In Formula (I), α, β, γ, and ω satisfy $5.0 \leq \alpha \leq 8.0$, $2.5 \leq \beta \leq 3.5$, $1.5 \leq \gamma \leq 2.5$, and $11 \leq \omega \leq 13$, respectively.

a preferably satisfies $5.5 \leq \alpha \leq 7.0$, more preferably $6.0 \leq \alpha \leq 6.8$, still more preferably $6.2 \leq \alpha \leq 6.8$, and particularly preferably $6.2 \leq \alpha \leq 6.6$, from the viewpoint of more sufficient suppression of an increase in electron conductivity.

β preferably satisfies $2.5 \leq \beta \leq 3.3$, more preferably $2.5 \leq \beta \leq 3.1$, and still more preferably $2.8 \leq \beta \leq 3.0$, from the viewpoint of more sufficient suppression of an increase in electron conductivity.

γ preferably satisfies $1.8 \leq \gamma \leq 2.5$, more preferably $1.8 \leq \gamma \leq 2.3$, and still more preferably $1.9 \leq \gamma \leq 2.3$, from the viewpoint of more sufficient suppression of an increase in electron conductivity.

ω preferably satisfies $11 \leq \omega \leq 12.5$ and more preferably $11.5 \leq \omega \leq 12.5$, from the viewpoint of more sufficient suppression of an increase in electron conductivity during operation.

When the content of B in Formula (I) described above (for example, the total number of La and $B^1$ in Formula (II) described below) is 100 mol %, the total content of the predetermined transition metal elements in the solid electrolyte ceramic of the present invention is usually more than 0 mol % and 3.50 mol % or less (for example, 0.01 mol % to 1.80 mol %), and is preferably more than 0 mol % and 1.20 mol % or less (for example, 0.01 mol % to 1.00 mol %), and more preferably more than 0 mol % and 0.25 mol % or less (for example, 0.01 mol % to 0.20 mol %), from the viewpoint of more excellent ion conductivity and more sufficient suppression of an increase in electron conductivity during operation.

The content of the predetermined transition metal element can be measured by performing inductively coupled plasma (ICP) emission spectrometry (ICP analysis) of the solid electrolyte ceramic to obtain the average chemical composition of the material. Specifically, the average chemical composition is determined based on ICP analysis, and from the average chemical composition, the contents of Co, Mn, and Ni can be determined as a ratio when the content of B in Formula (I) described above (for example, the total number of La and $B^1$ in Formula (II) described below) is 100 mol %. Measurement and calculation may be performed by inductively coupled plasma atomic emission spectrometry (ICP-AES), laser ablation inductively coupled plasma mass spectrometry (LA-ICP-MS), energy dispersive X-ray spectroscopy (TEM-EDX), wavelength dispersive X-ray spectroscopy (WDX) and/or an X-ray photoelectron spectroscopy analyzer (XPS: X-ray Photoelectron Spectroscopy).

When the content of D is 100 mol %, the content of bismuth (Bi) is usually more than 0 mol % and 50 mol % or less, and is preferably more than 0 mol % and 35 mol % or less, more preferably 0.5 mol % to 20 mol %, and still more preferably 2.5 mol % to 17.5 mol %, from the viewpoint of more excellent ion conductivity and more sufficient suppression of an increase in electron conductivity during operation.

Similarly to the content of the predetermined transition metal element, the content of Bi can also be measured by performing inductively coupled plasma (ICP) emission spectrometry (ICP analysis) of the solid electrolyte ceramic to obtain the average chemical composition of the material. Specifically, the average chemical composition is determined based on ICP analysis, and from the average chemical composition, the content of Bi can be determined as a ratio when the content of D in Formula (I) described above (for example, the total number of Bi and $D^1$ in Formula (II) described below) is 100 mol %. Measurement and calculation may be performed by inductively coupled plasma atomic emission spectrometry (ICP-AES), laser ablation inductively coupled plasma mass spectrometry (LA-ICP- MS), energy dispersive X-ray spectroscopy (TEM-EDX), wavelength dispersive X-ray spectroscopy (WDX) and/or an X-ray photoelectron spectroscopy analyzer (XPS: X-ray Photoelectron Spectroscopy).

In the present invention, the fact that the solid electrolyte ceramic has a garnet-type crystal structure means that the solid electrolyte ceramic has not only a "garnet-type crystal structure" but also a "pseudo-garnet-type crystal structure". Specifically, the solid electrolyte ceramic of the present invention has a crystal structure that can be recognized as a garnet-type or pseudo-garnet-type crystal structure by those skilled in the art of solid-state batteries in X-ray diffraction. More specifically, the solid electrolyte ceramic of the present invention may show, in X-ray diffraction, one or more main peaks corresponding to a Miller index unique to a so-called garnet-type crystal structure (diffraction pattern: ICDD Card No. 01-080-6142) at a predetermined incident angle, or as a pseudo-garnet-type crystal structure, one or more main peaks corresponding to a Miller index unique to a so-called garnet-type crystal structure may show one or more main peaks having different incident angles (that is, peak positions or diffraction angles) and intensity ratios (that is, peak intensities or diffraction intensity ratios) due to a difference in composition. Examples of a typical diffraction pattern of the pseudo-garnet-type crystal structure include ICDD Card No. 00-045-0109. At least sintered grains contained in the solid electrolyte ceramic as a main component of the present invention may have a garnet-type crystal structure.

As a specific embodiment, the solid electrolyte ceramic of the present invention can also have a chemical composition represented by Formula (II). Specifically, the solid electrolyte ceramic can have the chemical composition represented by Formula (II). The solid electrolyte ceramic of the present invention at this time further contains the predetermined transition metal element as described above while having the chemical composition represented by Formula (II).

$$(Li_pA^1_y)(La_{\beta-z}-B^1_z)(D^1_{\gamma-x}Bi_x)O_{12-\delta} \quad \text{(II)}$$

In Formula (II), $A^1$ refers to a metal element occupying the Li site in the garnet-type crystal structure. $A^1$ is an element corresponding to A in Formula (I) described above, and may be one or more elements selected from the group consisting of elements other than Li among elements similar to the elements exemplified as A. $A^1$ is usually one or more elements selected from the group consisting of gallium (Ga), aluminum (Al), magnesium (Mg), zinc (Zn), and scandium (Sc). $A^1$ is preferably one or more elements selected from the group consisting of gallium (Ga) and aluminum (Al), and more preferably two elements of Ga and Al from the viewpoint of more excellent ion conductivity and more sufficient suppression of an increase in electron conductivity during operation.

In Formula (II), $B^1$ refers to a metal element occupying the La site in the garnet-type crystal structure. $B^1$ is an element corresponding to B in Formula (I) described above, and may be one or more elements selected from the group consisting of elements other than La among elements similar to the elements exemplified as B. $B^1$ is usually one or more elements selected from the group consisting of calcium (Ca), strontium (Sr), barium (Ba), and lanthanoid elements.

In Formula (II), $D^1$ refers to a metal element occupying the six-coordination site in the garnet-type crystal structure. The six-coordination site in the garnet-type crystal structure is, for example, a site occupied by Nb in $Li_5La_3Nb_2O_{12}$ (ICDD Card No. 00-045-0109) having a garnet-type crystal structure, and a site occupied by Zr in $Li_7La_3Zr_2O_{12}$ (ICDD Card. No 01-078-6708) having a garnet-type crystal structure. $D^1$ is an element corresponding to D in Formula (I) described above, and may be one or more elements selected from the group consisting of elements other than Bi among elements similar to the elements exemplified as D. $D^1$ is usually one or more elements selected from the group consisting of zirconium (Zr), tin (Sn), antimony (Sb), titanium (Ti), tantalum (Ta), niobium (Nb), hafnium (Hf), molybdenum (Mo), tungsten (W) and tellurium (Te), and preferably includes one or more elements selected from the group consisting of zirconium (Zr) and tantalum (Ta), more preferably includes zirconium (Zr) and tantalum (Ta), and still more preferably includes zirconium (Zr) and tantalum (Ta), from the viewpoint of more excellent ion conductivity and more sufficient suppression of an increase in electron conductivity during operation.

In Formula (II), x satisfies $0<x\leq 1.00$, and preferably satisfies $0.01\leq x\leq 0.70$, more preferably $0.02\leq x\leq 0.40$, still more preferably $0.05\leq x\leq 0.40$, and particularly preferably $0.05\leq x\leq 0.35$, from the viewpoint of more excellent ion conductivity and more sufficient suppression of an increase in electron conductivity during operation.

y satisfies $0\leq y\leq 0.50$, preferably satisfies $0\leq y\leq 0.40$, more preferably $0\leq y\leq 0.30$, and still more preferably $0\leq y\leq 0.20$, and is particularly preferably 0, from the viewpoint of more excellent ion conductivity and more sufficient suppression of an increase in electron conductivity during operation.

β satisfies $2.5\leq\beta\leq 3.3$, and is preferably $2.5\leq\beta\leq 3.1$ and more preferably $2.8\leq\beta\leq 3.0$, from the viewpoint of more excellent ion conductivity and more sufficient suppression of an increase in electron conductivity during operation.

z satisfies $0\leq z\leq 2.00$, preferably satisfies $0\leq z\leq 1.00$ and more preferably $0\leq z\leq 0.50$, and is still more preferably 0, from the viewpoint of more excellent ion conductivity and more sufficient suppression of an increase in electron conductivity during operation.

γ satisfies $1.5\leq\gamma\leq 2.5$, and preferably satisfies $1.8\leq\gamma\leq 2.5$, more preferably $1.8\leq\gamma\leq 2.3$, and still more preferably $1.9\leq\gamma\leq 2.3$, from the viewpoint of more excellent ion conductivity and more sufficient suppression of an increase in electron conductivity during operation.

In Formula (II), p usually satisfies $6.0\leq p\leq 7.0$, and preferably satisfies $6.0\leq p\leq 6.6$ and more preferably $6.25\leq p\leq 6.55$, from the viewpoint of more excellent ion conductivity and more sufficient suppression of an increase in electron conductivity during operation.

a is an average valence of $A^1$. The average valence of $A^1$ is, for example, a value represented by $(n1\times a+n2\times +n3\times c)/(n1+n2+n3)$ when $A^1$ is recognized as n1 of elements X having a valence a+, n2 of elements Y having a valence b+, and n3 of elements Z having a valence c+.

b is an average valence of $B^1$. The average valence of $B^1$ is, for example, the same value as the average valence of $A^1$ described above when $B^1$ is recognized as n1 of elements X having a valence a+, n2 of elements Y having a valence b+, and n3 of elements Z having a valence c+.

c is an average valence of $D^1$. The average valence of $D^1$ is, for example, the same value as the average valence of $A^1$ described above when $D^1$ is recognized as n1 of elements X having a valence a+, n2 of elements Y having a valence b+, and n3 of elements Z having a valence c+.

δ represents an oxygen deficiency amount and may be 0. δ may usually satisfy $0\leq\delta<1$. The oxygen deficiency amount S cannot be quantitatively analyzed with the latest device, and thus may be considered to be 0.

The molar ratio of each element in the chemical composition of the solid electrolyte ceramic of the present invention does not necessarily coincide with, for example, the molar ratio of each element in Formula (II), and tends to deviate more than that depending on the analysis method, but the effect of the present invention is exhibited unless the composition deviation is such that the properties change.

In the present invention, the chemical composition of the solid electrolyte ceramic may be the composition of the whole ceramic material determined using an inductively coupled plasma method (ICP). The chemical composition may be measured and calculated using inductively coupled plasma atomic emission spectrometry (ICP-AES) or laser ablation inductively coupled plasma mass spectrometry (LA-ICP-MS). The chemical composition may be measured and calculated using XPS analysis, or may be determined using energy dispersive X-ray spectroscopy (TEM-EDX) and/or wavelength dispersive X-ray spectroscopy (WDX). The chemical composition may be obtained by performing quantitative analysis (composition analysis) at any 100 points of each of any 100 sintered grains and calculating the average value thereof.

The contents of the predetermined transition metal elements (that is, Co, Ni, and Mn) in the solid electrolyte ceramic of the present invention [for example, the molar ratio when the content of B in Formula (I) described above (or the total number of La and $B^1$ in Formula (II) described above) is 100 mol %] may be calculated by the following method. In the present invention, the chemical composition of the solid electrolyte ceramic can be determined by ICP analysis (inductively coupled plasma method), laser ablation ICP mass spectrometry (LA-ICP-MS) analysis, or the like. The chemical composition may be measured and calculated using XPS analysis or using energy dispersive X-ray spectroscopy (TEM-EDX) and/or wavelength dispersive X-ray spectroscopy (WDX). The chemical composition may be obtained by performing quantitative analysis (composition analysis) at any 100 points of each of any 100 sintered grains and calculating the average value thereof.

For example, analysis by EDX or WDX measures a cross-section of a solid-state battery. The cross-section of the solid-state battery is a cross-section parallel to the stacking direction of the positive electrode layer, the solid electrolyte layer, and the negative electrode layer. The cross-section of the solid-state battery can be exposed by embedding the solid-state battery in a resin and then performing polishing. The method of polishing the cross-section is not particularly limited, but the solid electrolyte layer can be exposed by cutting with a dicer or the like and then polishing the cross-section using polishing paper, chemical mechanical polishing, ion milling, or the like. The exposed cross-section (solid electrolyte layer) is quantitatively analyzed by EDX or WDX (wavelength dispersive X-ray fluorescence spectrometer), whereby the molar ratios of Co, Ni, and Mn to B can be calculated.

For example, in TEM-EELS measurement, an electrode layer or a solid electrolyte layer of the solid-state battery is peeled using a focused ion beam (FIB) or the like, and then transmission microscope-electron energy-loss spectroscopy (TEM-EELS) measurement of the solid electrolyte site is performed. As a result, elements contained in B, and Co, Ni, and Mn are detected, and the molar ratios of Co, Ni, and Mn to the content of B can be calculated.

Figure 2:
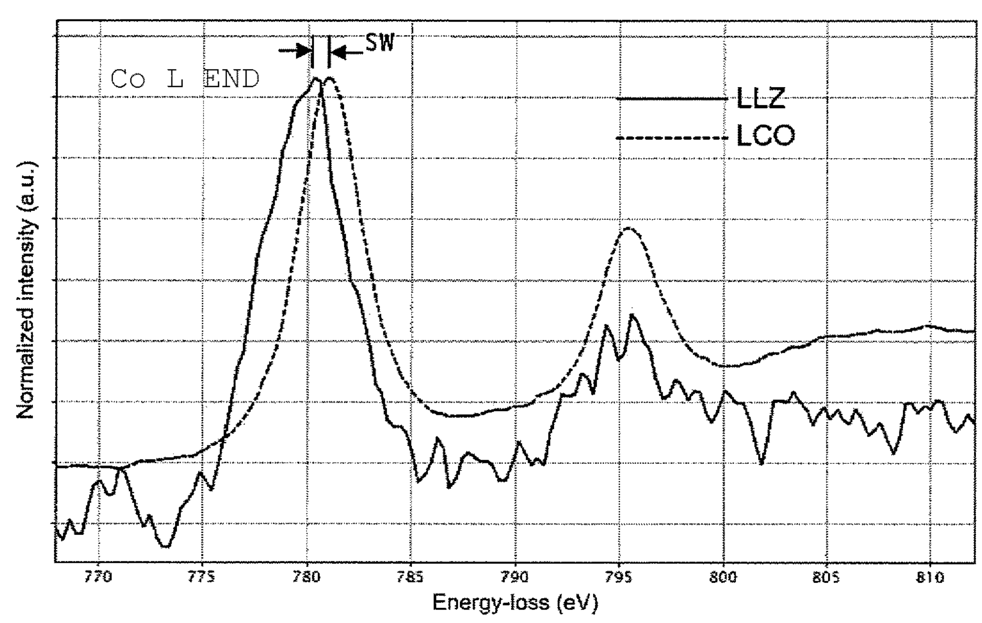
FIG. 2 shows an electron energy loss spectroscopic spectrum obtained by measuring bulk particles in a solid electrolyte in a solid electrolyte single plate of Example 5A.

In the electron energy loss spectroscopic spectrum (EELS spectrum) of the solid electrolyte ceramic (LLZ) of the present invention, as shown in the EELS spectrum of FIG. 2, the energy position of the Co L-end peak in the solid electrolyte ceramic (LLZ) of the present invention is lower than the energy position of the Co L-end peak of $LiCoO_2$ (LCO). Specifically, a shift width sw (see FIG. 2) between these peaks is usually 0.1 to 3 eV and preferably 0.3 to 2 eV. FIG. 2 shows an electron energy loss spectroscopic spectrum obtained by measuring bulk particles in a solid electrolyte in a solid electrolyte single plate prepared in Example.

Specific examples of the chemical composition indicating the solid electrolyte ceramic of the present invention include the following chemical compositions. In the chemical composition shown below, the transition metal element after the hyphen (-) may be present in the bulk and/or at the grain boundary as described above.

$Li_{6.3}La_3(Zr_{1.30}Ta_{0.40}Bi_{0.30})O_{12}$-0.001Co
$Li_{6.3}La_3(Zr_{1.30}Ta_{0.40}Bi_{0.30})O_{12}$-0.003Co
$Li_{6.3}La_3(Zr_{1.30}Ta_{0.40}Bi_{0.30})O_{12}$-0.005Co
$Li_{6.3}La_3(Zr_{1.30}Ta_{0.40}Bi_{0.30})O_{12}$-0.010Co
$Li_{6.3}La_3(Zr_{1.30}Ta_{0.40}Bi_{0.30})O_{12}$-0.025Co
$Li_{6.3}La_3(Zr_{1.30}Ta_{0.40}Bi_{0.30})O_{12}$-0.050Co
$Li_{6.3}La_3(Zr_{1.30}Ta_{0.40}Bi_{0.30})O_{12}$-0.001Mn
$Li_{6.3}La_3(Zr_{1.30}Ta_{0.40}Bi_{0.30})O_{12}$-0.005Mn
$Li_{6.3}La_3(Zr_{1.30}Ta_{0.40}Bi_{0.30})O_{12}$-0.010Mn
$Li_{6.3}La_3(Zr_{1.30}Ta_{0.40}Bi_{0.30})O_{12}$-0.001Ni
$Li_{6.3}La_3(Zr_{1.30}Ta_{0.40}Bi_{0.30})O_{12}$-0.005Ni
$Li_{6.3}La_3(Zr_{1.30}Ta_{0.40}Bi_{0.30})O_{12}$-0.010Ni
$Li_{6.3}La_3(Zr_{1.30}Ta_{0.40}Bi_{0.30})O_{12}$-0.005Co-0.005Ni-0.005Mn
$Li_{6.5}La_3(Zr_{1.53}Ta_{0.40}Bi_{0.07})O_{12}$-0.005Co
$Li_{6.5}La_3(Zr_{1.46}Ta_{0.40}Bi_{0.14})O_{12}$-0.005Co
$Li_{6.3}La_3(Zr_{1.30}Ta_{0.40}Bi_{0.30})O_{12}$-0.005Co
$Li_{6.1}La_3(Zr_{1.10}Ta_{0.40}Bi_{0.50})O_{12}$-0.005Co

The solid electrolyte ceramic of the present invention may contain Bi anywhere between a vicinity of grain boundaries and a grain interior described below in each sintered grain constituting the solid electrolyte ceramic as long as it contains the predetermined transition metal element. The Bi concentration may be substantially uniform between the vicinity of grain boundaries and the grain interior described below, or the Bi concentration may have a gradient. The solid electrolyte ceramics of the present invention according to the former and the latter can be referred to as "Bi concentration uniform structure-type solid electrolyte ceramic" and "Bi concentration gradient structure-type solid electrolyte ceramic", respectively.

In an embodiment of the present invention, the solid electrolyte ceramic of the present invention may be a "Bi concentration gradient structure-type solid electrolyte ceramic" containing the above-described predetermined transition metal element while the Bi concentration has a gradient between the vicinity of grain boundaries and the grain interior in each sintered grain. It is preferable that the Bi concentration gradient structure-type solid electrolyte ceramic of the present invention has the chemical composition represented by Formula (I) or (II) described above as the whole of the vicinity of grain boundaries and the grain interior in each sintered grain.

In each sintered grain constituting the Bi concentration gradient structure-type solid electrolyte ceramic of the present invention, specifically, the Bi concentration in the vicinity of grain boundaries is higher than the Bi concentration in the grain interior. More specifically, as illustrated in FIG. 1, a solid electrolyte ceramic 10 of the present invention is composed of a plurality of sintered grains 1, and in each of the sintered grains 1, the Bi concentration in a vicinity 3 of grain boundaries close to a grain boundary 2 is higher than the Bi concentration in a grain interior 4 surrounded by the vicinity 3 of grain boundaries. When the Bi concentration gradient structure-type solid electrolyte ceramic of the present invention contains a predetermined transition metal element while having such a Bi concentration gradient, the effect obtained by containing the predetermined transition metal element in the present invention (particularly, the suppressing effect on the increase in electron conductivity during operation) can be more sufficiently exhibited. FIG. 1 is an enlarged schematic view of a solid electrolyte ceramic for explaining a sintered grain constituting a Bi concentration gradient structure-type solid electrolyte ceramic of the present invention and the structure thereof. In FIG. 1, only three sintered grains 1 are illustrated, but usually many sintered grains are present around them while forming grain boundaries with the sintered grains adjacent to each other.

The vicinity 3 of grain boundaries is a region (that is, the region near grain boundaries) in which the distance from the grain boundary 2 (that is, the distance from the grain boundary 2 toward the grain interior 4) is 50 nm or less. Thus, the vicinity 3 of grain boundaries is disposed at the outer edge of the sintered grain (for example, in a sectional view) and surrounds the grain interior 4 described later.

The Bi concentration of the vicinity 3 of grain boundaries is an average Bi amount ($x_1$) in the region near grain boundaries as described above. In the present specification, 10 points in the vicinity 3 of grain boundaries are subjected to point analysis using energy dispersive X-ray spectroscopy (TEM-EDX), and an average value thereof is used as the Bi concentration in the vicinity 3 of grain boundaries. Specifically, in each of any 10 sintered grains, composition analysis was performed by point analysis at any 10 points in the vicinity 3 of grain boundaries to obtain a Bi/D ratio. The Bi amount x in Formula (I) described above is calculated from the Bi/D ratio, and the average value thereof is used. The vicinity 3 of grain boundaries of one sintered grain forms the grain boundary 2 between the vicinity 3 of grain boundaries of one or more sintered grains adjacent to the one sintered grain.

The grain interior 4 is a region where the distance from the grain boundary 2 (that is, the distance from the grain boundary 2 toward the grain interior 4) is more than 50 nm. Specifically, the grain interior 4 is an inner region surrounded by the vicinity 3 of grain boundaries (for example, in sectional view).

The Bi concentration of the grain interior 4 is an average Bi amount ($x_2$) in the grain interior 4 as described above. In the present specification, as the Bi concentration of the grain interior 4, 10 points in the grain interior 4 are subjected to point analysis using energy dispersive X-ray spectroscopy (TEM-EDX), and an average value thereof is used. Specifically, in each of any 10 sintered grains, composition analysis was performed by point analysis at any 10 points in the grain interior 4 to obtain a Bi/D ratio. The Bi amount x in Formula (I) described above is calculated from the Bi/D ratio, and the average value thereof is used.

In the present invention, in the solid electrolyte ceramic material having a garnet-type crystal structure, Bi can occupy the six-coordination site in the garnet-type crystal structure. In a preferred embodiment, when twice an amount of a molar ratio of Bi in the six-coordination site is defined as a Bi amount x, a relational expression shown below is satisfied:

$$x_2 < x_1$$

where $x_1$ is the Bi amount x in the vicinity 3 of grain boundaries and $x_2$ is the Bi amount x in the grain interior 4.

The six-coordination site in the garnet-type crystal structure described in the present invention refers to, for example, a site occupied by D in the chemical composition of Formula (I). In another specific example, the six-coordination site in the garnet-type crystal structure refers to, for example, a site occupied by Nb in $Li_5La_3Nb_2O_{12}$ (ICDD Card No. 00-045-0109) having a garnet-type crystal structure, and a site occupied by Zr in $Li_7La_3Zr_2O_{12}$ (ICDD Card. No 01-078-6708) having a garnet-type crystal structure.

The Bi amount $x_1$ in the vicinity 3 of grain boundaries and the Bi amount $x_2$ in the grain interior 4 preferably satisfy the relational expressions of the following Embodiment p1, more preferably the relational expressions of the following Embodiment p2, still more preferably the relational expressions of the following Embodiment p3, and particularly preferably the relational expressions of the following Embodiment p4 from the viewpoint of more excellent ion conductivity and more sufficient suppression of an increase in electron conductivity during operation.

$$0 \le x_1 \le 0.80; \text{ and } 0 \le x_2 \le 0.30. \quad \text{Embodiment p1}$$

$$0.20 \le x_1 \le 0.60; \text{ and } 0.01 \le x_2 \le 0.25. \quad \text{Embodiment p2}$$

$$0.30 \le x_1 \le 0.50; \text{ and } 0.05 \le x_2 \le 0.20. \quad \text{Embodiment p3}$$

$$0.35 \le x_1 \le 0.45; \text{ and } 0.08 \le x_2 \le 0.16. \quad \text{Embodiment p4}$$

The Bi amount $x_1$ in the vicinity 3 of grain boundaries and the Bi amount $x_2$ in the grain interior 4 preferably satisfy the relational expressions of the following Embodiment q1, more preferably the relational expressions of the following Embodiment q2, still more preferably the relational expressions of the following Embodiment q3, and particularly preferably the relational expressions of the following Embodiment q4 from the viewpoint of more excellent ion conductivity and more sufficient suppression of an increase in electron conductivity during operation.

$$0.01 \le x_1 - x_2. \quad \text{Embodiment q1}$$

$$0.01 \le x_1 - x_2 \le 0.50. \quad \text{Embodiment q2}$$

$$0.10 \le x_1 - x_2 \le 0.40. \quad \text{Embodiment q3}$$

$$0.15 \le x_1 - x_2 \le 0.35. \quad \text{Embodiment q4}$$

The average grain size of the sintered grains constituting the solid electrolyte ceramic is usually more than 100 nm and 100 μm or less, particularly 200 nm to 10 μm.

The average grain size of the sintered grains is an average grain size of the sintered grains whose outer edge is defined by a grain boundary.

In the present specification, as the average grain size of the sintered grains, an average value of any 100 grains obtained by performing grain analysis using a TEM image and image analysis software (for example, "Azo-kun" (manufactured by Asahi Kasei Engineering Corporation) and calculating the equivalent circle diameter is used.

[Method for Producing Solid Electrolyte Ceramic]

The Bi concentration uniform structure-type solid electrolyte ceramic of the present invention can be obtained by mixing a compound containing a predetermined metal element (that is, a starting material) with water, drying the mixture, and then heat-treating (for example, at least firing) the mixture. The compound containing a predetermined metal element is usually a mixture of compounds containing lithium (Li), lanthanum (La), bismuth (Bi), and one metal element selected from the group consisting of predetermined transition metal elements. Examples of the compound containing a predetermined metal element (that is, a starting material) include lithium hydroxide monohydrate $LiOH{\cdot}H_2O$, lanthanum hydroxide $La(OH)_3$, zirconium oxide $ZrO_2$, tantalum oxide $Ta_2O_5$, bismuth oxide $Bi_2O_3$, cobalt oxide $Co_3O_4$, basic nickel carbonate hydrate $NiCO_3{\cdot}2Ni(OH)_2.4H_2O$, and manganese carbonate $MnCO_3$. The mixing ratio of the compound containing a predetermined metal element may be such a ratio that the solid electrolyte ceramic of the present invention has a predetermined chemical composition after the heat treatment. The heat treatment temperature is usually 500° C. or higher and 1200° C. or lower, and preferably 600° C. or higher and 1000° C. or lower. The heat treatment time is usually 10 minutes or longer and 1440 minutes or shorter, particularly is 60 minutes or longer and 600 minutes or shorter.

The Bi concentration gradient structure-type solid electrolyte ceramic of the present invention may be obtained by heat-treating (for example, at least firing) Bi-free solid electrolyte particles as core particles and a Bi-containing solid electrolyte layer as a shell layer present around the Bi-free solid electrolyte particles. Specifically, the solid electrolyte ceramic can be obtained by element-diffusing Bi from the shell layer to the core particles. More specifically, a solution obtained by dissolving core particles and a solution obtained by dissolving a material for forming a shell layer are prepared, and both the solutions are mixed. Thereafter, the solvent is evaporated and then the heat treatment is performed to obtain solid electrolyte particles in which the core particles are coated with the shell layer. The solid electrolyte ceramic of the present invention can be obtained by heat-treating the solid electrolyte particles coated with the shell layer. The above production method is an example of obtaining the Bi concentration gradient structure-type solid electrolyte ceramic material of the present invention, and the solid electrolyte ceramic material may be produced by other production methods.

The core particles are Bi-free solid electrolyte particles, and for example, particles composed of a solid electrolyte having a garnet-type crystal structure and not containing Bi are used. As the core particles, a solid electrolyte having a garnet-type crystal structure containing Bi may be used as long as the Bi concentration gradient structure-type solid electrolyte ceramic of the present invention can be obtained. Examples of the solid electrolyte used as the core particles include the same materials as that of the solid electrolyte having the chemical composition represented by Formula (II) described above except that x is within the range of $0 \leq x < 1.0$. x is preferably in the same range as $x_2$ in Embodiments p1 to p4 described above. The core particles can be produced by the same method as the Bi concentration uniform structure-type solid electrolyte ceramic of the present invention described above.

The chemical composition indicating the solid electrolyte constituting the core particles is not particularly limited, and for example, the solid electrolyte ceramic of the present invention may have a chemical composition as a whole that has the chemical composition represented by Formula (I) or (II) described above.

The average particle size of the core particles is usually more than 50 nm and 100 μm or less, particularly 100 nm to 10 μm.

In the present specification, as the average particle size of the core particles, a value measured by the same measurement method as in the case of the average grain size of the sintered grains is used.

The material for forming a shell layer is a material for forming a Bi-containing solid electrolyte layer as a shell layer, and is, for example, a material mixture for forming a layer including a solid electrolyte having a garnet-type crystal structure containing Bi. The mixing ratio in the material mixture may be such a ratio that the shell layer and the solid electrolyte ceramic of the present invention have a predetermined chemical composition after sintering. Examples of Bi-containing solid electrolyte as the shell layer include the same materials as that of the solid electrolyte having the average chemical composition represented by Formula (II) described above, except that x is in the same range as $x_1$ in the Embodiments p1 to p4 described above.

The chemical composition indicating the solid electrolyte constituting the shell layer is not particularly limited, and for example, the solid electrolyte ceramic of the present invention may have a chemical composition as a whole that has the chemical composition represented by Formula (I) or (II) described above.

The average film thickness of the shell layer is usually more than 10 nm and 10 μm or less, particularly 20 nm to 1 μm.

In the present specification, the average film thickness of the shell layer may be calculated by performing TEM measurement of core particles having the shell layer, measuring the film thickness of the shell layer at any 20 points, and averaging the values.

The content of the material for forming a shell layer in the slurry is not particularly limited as long as the solid electrolyte ceramic of the present invention can be obtained, and may be, for example, 1 mol % to 70 mol %, particularly 10 mol % to 50 mol % with respect to 100 mol % of the core particles.

The solvent is not particularly limited as long as it can dissolve a material for forming a shell layer, and for example, a solvent that may be used for producing a positive electrode layer, a negative electrode layer, or a solid electrolyte layer in the field of solid-state batteries is used. As the solvent, a solvent capable of using the binder described below is usually used. Examples of such a solvent include alcohols such as 2-methoxyethanol.

The sintering conditions for forming the shell layer are not particularly limited as long as the Bi concentration gradient structure-type solid electrolyte ceramic of the present invention can be obtained. For example, when the sintering conditions are too strong, the Bi amount at the grain interior becomes too high, and it is not possible to obtain the Bi concentration gradient structure-type solid electrolyte ceramic of the present invention. For example, when the sintering conditions are too weak, elemental diffusion of Bi from the shell layer to the core particles does not occur, and it is not possible to obtain the Bi concentration gradient structure-type solid electrolyte ceramic of the present invention. The sintering temperature may be, for example, 600° C. or higher and 1100° C. or lower, particularly may be 700° C. or higher and 950° C. or lower. The sintering time may be, for example, 10 minutes or longer and 1440 minutes or shorter, particularly may be 60 minutes or longer and 600 minutes or shorter.

As a sintering aid that may be contained in the Bi concentration uniform structure-type and Bi concentration gradient structure-type solid electrolyte ceramics of the present invention, any sintering aid known in the field of solid-state batteries may be used. The composition of such a sintering aid contains at least lithium (Li), boron (B), and oxygen (O), and the molar ratio of Li to B (Li/B) is preferably 2.0 or more. Specific examples of such a sintering aid include $Li_3BO_3$, $(Li_{2.7}Al_{0.3})BO_3$, $Li_{2.8}(B_{0.8}C_{0.2})O_3$, and $LiBO_2$.

When the Bi concentration gradient structure-type solid electrolyte ceramic of the present invention contains a sintering aid, the content of the sintering aid is preferably as small as possible from the viewpoint of elemental diffusion of Bi, and is preferably 0% to 10%, particularly 0% to 5% with respect to the volume ratio of the garnet-type solid electrolyte.

[Solid-State Battery]

The "solid-state battery" in the present specification refers to a battery whose constituent elements (especially electrolyte layers) are formed of solids in a broad sense and refers to an "all-solid-state battery" whose constituent elements (especially all constituent elements) are formed of solids in a narrow sense. The "solid-state battery" in the present specification encompasses a so-called "secondary battery" that can be repeatedly charged and discharged and a "primary battery" that can only be discharged. The "solid-state battery" is preferably the "secondary battery". The "secondary battery" is not excessively limited by its name and can include, for example, an electrochemical device such as a "power storage device".

The solid-state battery of the present invention includes a positive electrode layer, a negative electrode layer, and a solid electrolyte layer, and usually has a stacked structure in which the positive electrode layer and the negative electrode layer are stacked with the solid electrolyte layer interposed therebetween. Each of the positive electrode layer and the negative electrode layer may be stacked in two or more layers as long as a solid electrolyte layer is provided therebetween. The solid electrolyte layer in contact with the positive electrode layer and the negative electrode layer is sandwiched therebetween. The positive electrode layer and the solid electrolyte layer may have sintered bodies sintered integrally with each other, and/or the negative electrode layer and the solid electrolyte layer may have sintered bodies sintered integrally with each other. Having sintered bodies sintered integrally with each other means that two or more members (in particular, layers) adjacent to or in contact with each other are joined by sintering. Here, the two or more members (in particular, layers) may be integrally sintered while they are sintered bodies.

The solid electrolyte ceramic of the present invention described above is useful as a solid electrolyte of a solid-state battery. Thus, the solid-state battery of the present invention contains the solid electrolyte ceramic of the present invention described above as a solid electrolyte. Specifically, the solid electrolyte ceramic of the present invention is contained as a solid electrolyte in at least one layer selected from the group consisting of a positive electrode layer, a negative electrode layer, and a solid electrolyte layer. The solid electrolyte ceramic of the present invention is preferably contained in at least the solid electrolyte layer from the viewpoint of more excellent ion conductivity in the solid electrolyte layer and more sufficient suppression of an increase in electron conductivity during operation.

(Positive Electrode Layer)

In the solid-state battery of the present invention, the positive electrode layer is not particularly limited. For example, the positive electrode layer contains a positive electrode active material and may further contain the solid electrolyte ceramic of the present invention. When the solid electrolyte ceramic of the present invention is contained in the positive electrode layer, a short circuit of the solid-state battery can be suppressed. The positive electrode layer may have a form of a sintered body containing positive electrode active material particles. The positive electrode layer may be a layer capable of occluding and releasing ions (in particular, lithium ions).

The positive electrode active material is not particularly limited, and a positive electrode active material known in the field of solid-state batteries may be used. Examples of the positive electrode active material include lithium-containing phosphate compound particles that have a NASICON-type structure, lithium-containing phosphate compound particles that have an olivine-type structure, lithium-containing layered oxide particles, lithium-containing oxide particles which have a spinel-type structure. Specific examples of a lithium-containing phosphoric acid compound that has a NASICON-type structure and is to be preferably used include $Li_3V_2(PO_4)_3$, and the like. Specific examples of the lithium-containing phosphate compound having an olivine-type structure preferably used include $Li_3Fe_2(PO_4)_3$ and $LiMnPO_4$. Specific examples of the lithium-containing layered oxide particles preferably used include $LiCoO_2$, and $LiCo_{1/3}Ni_{1/3}Mn_{1/3}O_2$. Specific examples of the preferably used lithium-containing oxide having a spinel-type structure include $LiMn_2O_4$, $LiNi_{0.5}Mn_{1.5}O_4$, and $Li_4Ti_5O_{12}$. From the viewpoint of reactivity during co-sintering with the garnet-type solid electrolyte used in the present invention, a lithium-containing layered oxide such as $LiCoO_2$ or $LiCo_{1/3}Ni_{1/3}Mn_{1/3}O_2$ is more preferably used as the positive electrode active material. Only one type of these positive electrode active material particles may be used, or a plurality of types thereof may be mixed and used.

The positive electrode active material having a NASICON-type structure in the positive electrode layer means that the positive electrode active material (in particular, its particles have a NASICON-type crystal structure, and in a broad sense, it means that the positive electrode active material has a crystal structure that may be recognized as a NASICON-type crystal structure by a person skilled in the art of solid-state batteries. In a narrow sense, the fact that the positive electrode active material has a NASICON-type structure in the positive electrode layer means that the positive electrode active material (in particular, particles thereof) exhibits, at a predetermined incident angle, one or more main peaks corresponding to a Miller index that is unique to a so-called NASICON-type crystal structure in X-ray diffraction. Examples of the positive electrode active material having a NASICON-type structure that is preferably used include the compounds exemplified above.

The positive electrode active material having an olivine-type structure in the positive electrode layer means that the positive electrode active material (in particular, its particles) has an olivine-type crystal structure, and in a broad sense, it means that the positive electrode active material has a crystal structure that may be recognized as an olivine-type crystal structure by a person skilled in the art of solid-state batteries. In a narrow sense, the fact that the positive electrode active material has an olivine-type structure in the positive electrode layer means that the positive electrode active material (in particular, particles thereof) exhibits, at a predetermined incident angle, one or more main peaks corresponding to a Miller index that is unique to a so-called olivine-type crystal structure in X-ray diffraction. Examples of the positive electrode active material having an olivine-type structure that is preferably used include the compounds exemplified above.

The positive electrode active material having a spinel-type structure in the positive electrode layer means that the positive electrode active material (in particular, its particles) has a spinel-type crystal structure, and in a broad sense, it means that the positive electrode active material has a crystal structure that may be recognized as a spinel-type crystal structure by those skilled in the art of solid-state batteries. In a narrow sense, the positive electrode active material having a spinel-type structure in the positive electrode layer means that the positive electrode active material (in particular, its particles) exhibits one or more main peaks corresponding to Miller indices unique to a so-called spinel-type crystal structure at a predetermined incident angle in X-ray diffraction. Examples of the positive electrode active material having a spinel-type structure that is preferably used include the compounds exemplified above.

The chemical composition of the positive electrode active material may be an average chemical composition. The average chemical composition of the positive electrode active material means an average value of the chemical compositions of the positive electrode active material in the thickness direction of the positive electrode layer. The average chemical composition of the positive electrode active material may be analyzed and measured by breaking the solid-state battery and performing composition analysis by EDX using SEM-EDX (energy dispersive X-ray spectroscopy) in a field of view in which the whole positive electrode layer fits in the thickness direction.

The positive electrode active material may be produced, for example, by the following method, or may be obtained as a commercially available product. In producing a positive electrode active material, first, a raw material compound containing a predetermined metal atom is weighed to have a predetermined chemical composition, and water is added and mixed to obtain a slurry. Next, the slurry is dried, calcined at 700° C. or higher and 1000° C. or lower for 1 hour or longer and 30 hours or shorter, and pulverized, whereby a positive electrode active material may be obtained.

The chemical composition and crystal structure of the positive electrode active material in the positive electrode layer may be usually changed by element diffusion during sintering. The positive electrode active material may have the chemical composition and crystal structure described above in the solid-state battery after being sintered together with the negative electrode layer and the solid electrolyte layer.

The average particle size of the positive electrode active material is not particularly limited, and may be, for example, 0.01 μm to 10 μm, and preferably 0.05 μm to 4 μm.

As the average particle size of the positive electrode active material, for example, 10 to 100 particles are randomly selected from the SEM image, and the particle sizes thereof may be simply averaged to determine the average particle size (arithmetic average).

The particle size is the diameter of a spherical particle when the particle is assumed to be a perfect sphere. For such a particle size, for example, a section of the solid-state battery is cut out, a sectional SEM image is photographed using an SEM, the sectional area S of the particle is calculated using image analysis software (for example, "Azo-kun" (manufactured by Asahi Kasei Engineering Corporation)), and then the particle diameter R may be determined by the following formula.

$$R = 2\times(S/\pi)^{1/2} \quad \text{[Mathematical Formula 1]}$$

The average particle size of the positive electrode active material in the positive electrode layer may be automatically measured by specifying the positive electrode active material according to the composition at the time of measuring the average chemical composition described above.

Usually, the average particle size of the positive electrode active material in the positive electrode layer may change due to sintering in the process of producing the solid-state battery. In the solid-state battery after being sintered together with the negative electrode layer and the solid electrolyte layer, the positive electrode active material may have the average particle size described above.

The proportion by volume of the positive electrode active material in the positive electrode layer is not particularly limited, and may be, for example, 30% to 90%, and particularly 40% to 70%.

The positive electrode layer may contain the solid electrolyte ceramic of the present invention as a solid electrolyte, and/or may contain a solid electrolyte other than the solid electrolyte ceramic of the present invention.

The positive electrode layer may further contain a sintering aid and/or a conductive material.

When the positive electrode layer contains the solid electrolyte ceramic of the present invention, the proportion by volume of the solid electrolyte ceramic of the present invention may be usually 20% to 60%, and particularly 30% to 45%.

As the sintering aid in the positive electrode layer, the same compound as the sintering aid that may be contained in the solid electrolyte ceramic may be used.

The proportion by volume of the sintering aid in the positive electrode layer is not particularly limited, and for example, is preferably 0.1% to 20% and more preferably 1% to 10%.

As the conductive material in the positive electrode layer, a conductive material known in the field of solid-state batteries may be used. Examples of the conductive material to be preferably used include metal materials such as silver (Ag), gold (Au), palladium (Pd), platinum (Pt), copper (Cu), tin (Sn), and nickel (Ni); and carbon materials such as carbon nanotubes, for example, acetylene black, Ketjen black, Super P (registered trademark), and VGCF (registered trademark). The shape of the carbon material is not particularly limited, and any shape such as a spherical shape, a plate shape, and a fibrous shape may be used.

The proportion by volume of the conductive material in the positive electrode layer is not particularly limited, and for example, is preferably 10% to 50% and more preferably 20% to 40%.

The thickness of the positive electrode layer is usually 0.1 to 30 μm, and for example, preferably 1 to 20 μm. As the thickness of the positive electrode layer, an average value of thicknesses measured at any 10 points in an SEM image is used.

In the positive electrode layer, the porosity is not particularly limited, but is preferably 20% or less, more preferably 15% or less, and still more preferably 10% or less.

As the porosity of the positive electrode layer, a value measured from an SEM image after FIB section processing is used.

The positive electrode layer is a layer that may be referred to as a "positive electrode active material layer". The positive electrode layer may have a so-called positive electrode current collector or a positive electrode current collecting layer.

(Negative Electrode Layer)

In the solid-state battery of the present invention, the negative electrode layer is not particularly limited. For example, the negative electrode layer contains a negative electrode active material and may further contain the solid electrolyte ceramic of the present invention. When the solid electrolyte ceramic of the present invention is contained in the negative electrode layer, a short circuit of the solid-state battery can be suppressed. The negative electrode layer may have a form of a sintered body containing negative electrode active material particles. The negative electrode layer may be a layer capable of occluding and releasing ions (in particular, lithium ions).

The negative electrode active material is not particularly limited, and a negative electrode active material known in the field of solid-state batteries may be used. Examples of the negative electrode active material include carbon materials such as graphite, graphite-lithium compounds, lithium metal, lithium alloy particles, phosphate compounds having a NASICON-type structure, Li-containing oxides having a spinel-type structure, and oxides having a $\beta_{II}$-$Li_3VO_4$-type structure and a $\gamma_{II}$-$Li_3VO_4$-type structure. As the negative electrode active material, it is preferable to use lithium metal or a Li-containing oxide having a $\beta_{II}$-$Li_3VO_4$-type structure or a $\gamma_{II}$-$Li_3VO_4$-type structure.

The oxide having a $\beta_{II}$-$Li_3VO_4$-type structure in the negative electrode layer means that the oxide (in particular, its particles) has a $\beta_{II}$-$Li_3VO_4$-type crystal structure, and in a broad sense, it means that the oxide has a crystal structure that may be recognized as a $\beta_{II}$-$Li_3VO_4$-type crystal structure by a person skilled in the art of solid-state batteries. In a narrow sense, the oxide having a $\beta_{II}$-$Li_3VO_4$-type structure in the negative electrode layer means that the oxide (in particular, its particles) exhibits one or more main peaks corresponding to Miller indices unique to a so-called $\beta_{II}$-$Li_3VO_4$-type crystal structure at a predetermined incident angle in X-ray diffraction. Examples of the Li-containing oxide having a $\beta_{II}$-$Li_3VO_4$-type structure preferably used include $Li_3VO_4$.

The oxide having a $\gamma_{II}$-$Li_3VO_4$-type structure in the negative electrode layer means that the oxide (in particular, its particles) has a $\gamma_{II}$-$Li_3VO_4$-type crystal structure, and in a broad sense, it means that the oxide has a crystal structure that may be recognized as a $\gamma_{II}$-$Li_3VO_4$-type crystal structure by a person skilled in the art of solid-state batteries. In a narrow sense, the oxide having a $\gamma_{II}$-$Li_3VO_4$-type structure in the negative electrode layer means that the oxide (in particular, its particles) exhibits one or more main peaks corresponding to Miller indices unique to a so-called $\gamma_{II}$-$Li_3VO_4$-type crystal structure at a predetermined incident angle (x-axis) in X-ray diffraction. Examples of the Li-containing oxide having a $\gamma_{II}$-$Li_3VO_4$-type structure preferably used include $Li_{3.2}V_{0.8}Si_{0.2}O_4$.

The chemical composition of the negative electrode active material may be an average chemical composition. The average chemical composition of the negative electrode active material means an average value of the chemical compositions of the negative electrode active material in the thickness direction of the negative electrode layer. The average chemical composition of the negative electrode active material may be analyzed and measured by breaking the solid-state battery and performing composition analysis by EDX using SEM-EDX (energy dispersive X-ray spectroscopy) in a field of view in which the whole negative electrode layer fits in the thickness direction.

The negative electrode active material may be produced, for example, by the same method as the positive electrode active material or may be obtained as a commercially available product.

Usually, the chemical composition and crystal structure of the negative electrode active material in the negative electrode layer may be changed by element diffusion during sintering in the production process of the solid-state battery. The negative electrode active material may have the average chemical composition and crystal structure described above in the solid-state battery after being sintered together with the positive electrode layer and the solid electrolyte layer.

The proportion by volume of the negative electrode active material in the negative electrode layer is not particularly limited, and for example, is preferably 50% or more (particularly 50% to 99%), more preferably 70% to 95%, and still more preferably 80% to 90%.

The negative electrode layer may contain the solid electrolyte ceramic of the present invention as a solid electrolyte, and/or may contain a solid electrolyte other than the solid electrolyte ceramic of the present invention.

The negative electrode layer may further contain a sintering aid and/or a conductive material.

When the negative electrode layer contains the solid electrolyte ceramic of the present invention, the proportion by volume of the solid electrolyte ceramic of the present invention may be usually 20% to 60%, and particularly 30% to 45%.

As the sintering aid in the negative electrode layer, the same compound as the sintering aid in the positive electrode layer may be used.

As the conductive material in the negative electrode layer, the same compound as the conductive material in the positive electrode layer may be used.

The thickness of the negative electrode layer is usually 0.1 to 30 μm and preferably 1 to 20 μm. As the thickness of the negative electrode layer, an average value of thicknesses measured at any 10 points in an SEM image is used.

In the negative electrode layer, the porosity is not particularly limited, but is preferably 20% or less, more preferably 15% or less, and still more preferably 10% or less.

As the porosity of the negative electrode layer, a value measured by the same method as the porosity of the positive electrode layer is used.

The negative electrode layer is a layer that may be referred to as a "negative electrode active material layer". The negative electrode layer may have a so-called negative electrode current collector or a negative electrode current collecting layer.

(Solid Electrolyte Layer)

In the solid-state battery of the present invention, the solid electrolyte layer preferably contains the solid electrolyte ceramic of the present invention described above from the viewpoint of more excellent ion conductivity and more sufficient suppression of an increase in electron conductivity during operation.

The proportion by volume of the solid electrolyte ceramic of the present invention in the solid electrolyte layer is not particularly limited, and is preferably 10% to 100%, more preferably 20% to 100%, and still more preferably 30% to 100%, from the viewpoint of more excellent ion conductivity and more sufficient suppression of an increase in electron conductivity during operation.

When the solid electrolyte layer contains the solid electrolyte ceramic of the present invention, the solid electrolyte ceramic of the present invention having the chemical composition may be present at least at the central part (particularly, 5 points or more, preferably 8 points or more, and more preferably 10 points in the arbitrary 10 points) in the thickness direction of the solid electrolyte layer. This is because the solid electrolyte layer is sandwiched between the positive electrode layer and the negative electrode layer, and element diffusion from the positive electrode layer and the negative electrode layer to the solid electrolyte layer and/or element diffusion from the solid electrolyte layer to the positive electrode layer and the negative electrode layer may occur by sintering in the manufacturing process of a solid-state battery.

In addition to the garnet-type solid electrolyte ceramic of the present invention, the solid electrolyte layer may contain one or more materials selected from a solid electrolyte composed of at least Li, Zr, and O, a solid electrolyte having a $\gamma$-$Li_3VO_4$ structure, and an oxide glass ceramic-based lithium ion conductor. Examples of the solid electrolyte composed of at least Li, Zr, and O include $Li_2ZrO_3$.

Examples of the solid electrolyte having a $\gamma$-$Li_3VO_4$ structure include a solid electrolyte having an average chemical composition represented by the following Formula (III).

$$(Li_{[3-ax+(5-c)(1-y)]}A_x)(B_yD_{1-y})O_4 \quad \text{(III)}$$

In Formula (III), A is one or more elements selected from the group consisting of Na, K, Mg, Ca, Al, Ga, Zn, Fe, Cr, and Co.

B is one or more elements selected from the group consisting of V and P.

D is one or more elements selected from the group consisting of Zn, Al, Ga, Si, Ge, Sn, As, Ti, Mo, W, Fe, Cr, and Co.

x satisfies $0 \le x \le 1.0$, particularly satisfies $0 \le x \le 0.2$.

y satisfies $0 \le y \le 1.0$, particularly satisfies $0.20 \le y \le 0.50$.

a is an average valence of A. The average valence of A is, for example, a value represented by $(n1 \times a+n2 \times b+n3 \times c)/(n1+n2+n3)$ when A is recognized as n1 of elements X having a valence a+, n2 of elements Y having a valence b+, and n3 of elements Z having a valence c+.

c is an average valence of D. The average valence of D is, for example, the same value as the average valence of A described above when D is recognized as n1 of elements X having a valence a+, n2 of elements Y having a valence b+, and n3 of elements Z having a valence c+.

Specific examples of the solid electrolyte having a $\gamma$-$Li_3VO_4$ structure include $Li_{3.2}(V_{0.8}Si_{0.2})O_4$, $Li_{3.5}(V_{0.5}Ge_{0.5})O_4$, $Li_{3.4}(P_{0.6}Si_{0.4})O_4$, and $Li_{3.5}(P_{0.5}Ge_{0.5})O_4$.

As the oxide glass ceramic-based lithium ion conductor, for example, a phosphate compound (LATP) containing lithium, aluminum, and titanium as constituent elements, and a phosphate compound (LAGP) containing lithium, aluminum, and germanium as constituent elements can be used.

The solid electrolyte layer may further contain, for example, a sintering aid and the like in addition to the solid electrolyte.

As the sintering aid in the solid electrolyte layer, the same compound as the sintering aid in the positive electrode layer may be used.

The proportion by volume of the sintering aid in the solid electrolyte layer is not particularly limited, and is preferably 0% to 20%, and more preferably 1% to 10%, from the viewpoint of more excellent ion conductivity and more sufficient suppression of an increase in electron conductivity during operation.

The thickness of the solid electrolyte layer is usually 0.1 to 30 μm and is preferably 1 to 20 μm from the viewpoint of more excellent ion conductivity and more sufficient suppression of an increase in electron conductivity during operation. As the thickness of the solid electrolyte layer, an average value of thicknesses measured at any 10 points in an SEM image is used.

In the solid electrolyte layer, the porosity is not particularly limited, and is preferably 20% or less, more preferably 15% or less, and still more preferably 10% or less, from the viewpoint of more excellent ion conductivity and more sufficient suppression of an increase in electron conductivity during operation.

As the porosity of the solid electrolyte layer, a value measured by the same method as the porosity of the positive electrode layer is used.

[Method for Manufacturing Solid-State Battery]

The solid-state battery can be manufactured, for example, by a so-called green sheet method, a printing method, or a combined method thereof.

The green sheet method will be described.

First, a solvent, a binder, and the like are appropriately mixed with a positive electrode active material to prepare a paste. The paste is applied onto a sheet and dried to form a first green sheet for forming a positive electrode layer. The first green sheet may contain a solid electrolyte, a conductive material, and/or a sintering aid.

A solvent, a binder, and the like are appropriately mixed with a negative electrode active material to prepare a paste. The paste is applied onto a sheet, and dried to form a second green sheet for constituting the negative electrode layer. The second green sheet may contain a solid electrolyte, a conductive material, and/or a sintering aid.

A solvent, a binder, and the like are appropriately mixed with a solid electrolyte to prepare a paste. The paste is applied onto a sheet and dried to form a third green sheet for forming a solid electrolyte layer. The third green sheet may contain a sintering aid and the like.

The solvent for producing the first to third green sheets is not particularly limited, and for example, a solvent that may be used for producing a positive electrode layer, a negative electrode layer, or a solid electrolyte layer in the field of solid-state batteries is used. As the solvent, a solvent capable of using the binder described later is usually used. Examples of such a solvent include alcohols such as 2-propanol.

The binder for producing the first to third green sheets is not particularly limited, and for example, a binder that may be used for producing a positive electrode layer, a negative electrode layer, or a solid electrolyte layer in the field of solid-state batteries is used. Examples of such a binder include a butyral resin and an acrylic resin.

Next, the first to third green sheets are appropriately stacked to produce a laminate. The produced laminate may be pressed. Examples of a preferable pressing method include an isostatic pressing method.

Thereafter, the laminate is sintered at, for example, 600 to 800° C. to obtain a solid-state battery.

The printing method will be described.

The printing method is the same as the green sheet method except for the following matters.

An ink of each layer is prepared, the ink having the same composition as the composition of the paste of each layer for obtaining a green sheet except that the blending amounts of the solvent and the resin are adjusted to those suitable for use as the ink.

The ink of each layer is printed and stacked to produce a laminate.

Hereinafter, the present invention will be described in more detail based on specific examples, but the present invention is not limited to the following examples at all and may be appropriately changed and implemented without changing the gist thereof.

EXAMPLES

Example 1: Bi Concentration Uniform Structure-Type Solid Electrolyte Ceramic

Examples 1A to 14A, 1B to 3B, and 1C to 4C and Comparative Example 1

Production of Solid Electrolyte Ceramic

Lithium hydroxide monohydrate $LiOH \cdot H_2O$, lanthanum hydroxide $La(OH)_3$, zirconium oxide $ZrO_2$, tantalum oxide $Ta_2O_5$, bismuth oxide $Bi_2O_3$, cobalt oxide $Co_3O_4$, basic nickel carbonate hydrate $NiCO_3 \cdot 2Ni(OH)_2 \cdot 4H_2O$, and manganese carbonate $MnCO_3$ were used for raw materials.

Each starting material was weighed so as to have each chemical composition in Table 1, 2, or 3.

Water was added, the resulting mixture was sealed in a polyethylene polypot, and the polypot was rotated on a pot rack at 150 rpm for 16 hours to mix the raw materials.

Lithium hydroxide monohydrate $LiOH \cdot H_2O$ as a Li source was charged in an excess of 3 wt % with respect to the target composition in consideration of Li deficiency during sintering.

The obtained slurry was evaporated and dried, and then calcined in $O_2$ at 900° C. for 5 hours to obtain a target phase.

The calcined powder obtained was, with the addition of a mixed solvent of toluene-acetone thereto, subjected to grinding for 12 hours in a planetary ball mill. This ground powder was confirmed to have no compositional deviation through ICP measurement. The average particle size of the ground powder at this time was 150 nm.

[Production of Solid Electrolyte Single Plate]

As a sample for evaluation of a solid electrolyte ceramic, a solid electrolyte single plate was produced by the following method.

The obtained ground powder was kneaded with a butyral resin, an alcohol, and a binder to produce a slurry.

The slurry was sheet-molded on a PET film using a doctor blade method to obtain a sheet. The produced sheet was stacked until the thickness of the sheet reached 200 μm, the sheet was then cut into a square shape having a size of 10 mm×10 mm, the binder was removed at 400° C., and then the sheet was subjected to press sintering at 950° C. for 300 minutes under a pressure of 100 MPa to produce a solid electrolyte single plate. The porosity of the solid electrolyte single plate was 10% or less, and it was confirmed that sintering sufficiently proceeded. A surface of the resultant sintered body was polished to obtain a garnet solid electrolyte substrate.

[Crystal Structure of Solid Electrolyte Single Plate]

In all Examples and Comparative Examples, it was confirmed that X-ray diffraction images capable of being assigned to a pseudo-garnet-type crystal structure were obtained from X-ray diffraction of the solid electrolyte single plate (ICDD Card No. 00-045-0109).

[Chemical Composition of Solid Electrolyte Single Plate]

The solid electrolyte single plate was subjected to ICP-AES analysis to obtain the average chemical composition of the solid electrolyte single plate. The contents of Co, Mn, and Ni in the average chemical composition of the whole solid electrolyte single plate were determined as a ratio when the content of B in Formula (I) described above of the garnet-type crystal structure (for example, the total number of La and B in Formula (II) described above) was 100 mol %.

In Example 2A, quantitative analysis was also performed by LA-ICP-MS, and it was confirmed that the results were equivalent.

In Examples 4A, 5A, 13A, and 14A, quantitative analysis with WDX was performed, and it was confirmed that the results were equivalent.

[Electron Conductivity Measurement (Before and After Storage Test)

An Au electrode was sputtered on one surface of the obtained single plate to obtain a working electrode. A Li metal having the same area as the Au electrode was attached to the other surface. Finally, a cell was enclosed in a 2035 size coin cell to obtain an evaluation cell. All the operations described above were performed in a dry room having a dew point of −40° C. or lower.

At room temperature, 2 V relative to Li was applied to the working electrode, and a transient current was observed. The current that flowed 10 hours after the voltage application was read as the leakage current before the storage test. It was confirmed that the leakage current value before the storage test was approximately in the range of $1\times10^{-10}$ to $6\times10^{-7}$ S/cm. Thereafter, the cell was stored at 90° C. for about one month, the above test was performed again, and the leakage current after the storage test was read. From the leakage current, the electron conductivity was calculated using the following formula.

$$\text{Electron conductivity} = (I/V)\times(L/A)$$

(I: Leakage Current, V: Applied Voltage, L: Solid Electrolyte Single Plate Thickness, A: Electrode Area)

The electron conductivity after the storage test was evaluated according to the following criteria.

⊚: electron conductivity $<1.0\times10^{-8}$ S/cm (excellent);

○; $1.0\times10^{-8}$ S/cm electron conductivity $<1.0\times10^{-7}$ S/cm (good);

Δ; $1.0\times10^{-7}$ S/cm electron conductivity $<1.0\times10^{-6}$ S/cm (acceptable) (has no practical problem);

x; $1.0\times10^{-6}$ S/cm electron conductivity (not acceptable) (has a practical problem).

[Measurement of Ionic Conductivity]

A gold (Au) layer serving as a current collector layer was formed on both surfaces of a solid electrolyte single plate by sputtering, and then the resulting gold layer was sandwiched by SUS current collectors and fixed.

The sintered tablet of each solid electrolyte was subjected to AC impedance measurement at room temperature (25° C.) in the range of 0.1 Hz to 10 MHz (±50 mV) to evaluate the ionic conductivity.

⊚: $5.0\times10^{-4}$ S/cm ionic conductivity (excellent);

○; $1.0\times10^{-4}$ S/cm ionic conductivity $<5.0\times10^{-4}$ S/cm (good);

Δ; $5.0\times10^{-5}$ S/cm ionic conductivity $<1.0\times10^{-4}$ S/cm (acceptable) (has no practical problem);

x; ionic conductivity $<5.0\times10^{-5}$ S/cm (not acceptable) (has a practical problem).

TABLE 1

| | Chemical composition ($A_{\alpha}B_{\beta}D_{\gamma}O_{\omega}$) (I)* | Analysis method*** | Co/B Molar ratio (%)** | Mn/B Molar ratio (8)** | Ni/B Molar ratio (8)** |
|---|---|---|---|---|---|
| Comparative Example 1 | Li6.3La3 (Zr1.3Ta0.40Bi0.30) O12 | ICP-AES | 0 | 0 | 0 |
| Example 1A | Li6.3La3 (Zr1.3Ta0.40Bi0.30) O12—0.001Co | ICP-AES | 0.03 | 0 | 0 |
| Example 2A | Li6.3La3 (Zr1.3Ta0.40Bi0.30) O12—0.003Co | ICP-AES LA-ICP-AES | 0.10 | 0 | 0 |
| Example 3A | Li6.3La3 (Zr1.3Ta0.40Bi0.30) O12—0.005Co | ICP-AES | 0.17 | 0 | 0 |
| Example 4A | Li6.3La3 (Zr1.3Ta0.40Bi0.30) O12—0.010Co | ICP-AES WDX | 0.33 | 0 | 0 |
| Example 5A | Li6.3La3 (Zr1.3Ta0.40Bi0.30) O12—0.025Co | ICP-AES WDX, EELS | 0.83 | 0 | 0 |
| Example 6A | Li6.3La3 (Zr1.3Ta0.40Bi0.30) O12—0.050Co | ICP-AES | 1.67 | 0 | 0 |
| Example 7A | Li6.3La3 (Zr1.3Ta0.40Bi0.30) O12—0.001Mn | ICP-AES | 0 | 0.03 | 0 |
| Example 8A | Li6.3La3 (Zr1.3Ta0.40Bi0.30) O12—0.005Mn | ICP-AES | 0 | 0.17 | 0 |
| Example 9A | Li6.3La3 (Zr1.3Ta0.40Bi0.30) O12—0.010Mn | ICP-AES | 0 | 0.33 | 0 |
| Example 10A | Li6.3La3 (Zr1.3Ta0.40Bi0.30) O12—0.001Ni | ICP-AES | 0 | 0 | 0.03 |
| Example 11A | Li6.3La3 (Zr1.3Ta0.40Bi0.30) O12—0.005Ni | ICP-AES | 0 | 0 | 0.17 |
| Example 12A | Li6.3La3 (Zr1.3Ta0.40Bi0.30) O12—0.005Co—0.005Ni—0.005Mn | ICP-AES | 0.17 | 0.17 | 0.17 |
| Example 13A | Li6.3La3 (Zr1.3Ta0.40Bi0.30) O12—0.10Co | ICP-AES WDX | 3.33 | 0 | 0 |
| Example 14A | Li6.3La3 (Zr1.3Ta0.40Bi0.30) O12—0.050Mn | ICP-AES WDX | 0 | 1.67 | 0 |

| | Ionic conductivity (S/cm) | Determination | Electron conductivity before storage test (S/cm) | Electron conductivity after storage test (S/cm) | Determination |
|---|---|---|---|---|---|
| Comparative Example 1 | $7 \times 10^{-4}$ | ⊙ | $4 \times 10^{-11}$ | $4 \times 10^{-5}$ | X |
| Example 1A | — | — | — | $7 \times 10^{-9}$ | ⊙ |
| Example 2A | $7 \times 10^{-4}$ | ⊙ | — | $4 \times 10^{-9}$ | ⊙ |
| Example 3A | $7 \times 10^{-4}$ | ⊙ | $8 \times 10^{-11}$ | $9 \times 10^{-9}$ | ⊙ |
| Example 4A | $7 \times 10^{-4}$ | ⊙ | $3 \times 10^{-10}$ | $2 \times 10^{-8}$ | ○ |
| Example 5A | — | — | $9 \times 10^{-9}$ | $8 \times 10^{-8}$ | ○ |
| Example 6A | $3 \times 10^{-4}$ | ○ | $3 \times 10^{-7}$ | $3 \times 10^{-7}$ | Δ |
| Example 7A | — | — | — | $5 \times 10^{-8}$ | ○ |
| Example 8A | $7 \times 10^{-4}$ | ⊙ | $6 \times 10^{-11}$ | $1 \times 10^{-8}$ | ○ |
| Example 9A | $7 \times 10^{-4}$ | ⊙ | — | $5 \times 10^{-8}$ | ○ |
| Example 10A | — | — | — | $8 \times 10^{-8}$ | ○ |
| Example 11A | $7 \times 10^{-4}$ | ⊙ | $5 \times 10^{-8}$ | $5 \times 10^{-8}$ | ○ |
| Example 12A | $6 \times 10^{-4}$ | ⊙ | — | $4 \times 10^{-9}$ | ⊙ |
| Example 13A | — | — | — | $8 \times 10^{-7}$ | Δ |
| Example 14A | $5 \times 10^{-4}$ | ○ | $1 \times 10^{-8}$ | $1 \times 10^{-7}$ | Δ |

*Oxygen (O) in the chemical composition is a value calculated so as to establish charge neutrality from the molar ratio and valence of the elements included in A, B, and D.

**It is a content when the content of B in Chemical Formula (I) (La in Examples) is 100 mol %.

**Analysis method used in calculation of the chemical composition

TABLE 2

| | Chemical composition ($A_{\alpha}B_{\beta}D_{\gamma}O_{\omega}$) (I)* | Co/B Molar ratio (%)** | Mn/B Molar ratio (%)** | Ni/B Molar ratio (%)** | Electron conductivity after storage test (S/cm) | Determination |
|---|---|---|---|---|---|---|
| Example 1B | Li6.5La3(Zr1.53Ta0.4Bi0.07)O12—0.0050Co | 0.17 | 0 | 0 | $5 \times 10^{-10}$ | ⊙ |
| Example 2B | Li6.5La3(Zr1.46Ta0.4Bi0.14)O12—0.0050Co | 0.17 | 0 | 0 | $2 \times 10^{-9}$ | ⊙ |
| Example 3A | Li6.3La3(Zr1.30Ta0.40Bi0.30)O12—0.0050Co | 0.17 | 0 | 0 | $9 \times 10^{-9}$ | ⊙ |
| Example 3B | Li6.1La3(Zr1.10Ta0.40Bi0.50)O12—0.0050Co | 0.17 | 0 | 0 | $3 \times 10^{-7}$ | Δ |

*Oxygen (O) in the chemical composition is a value calculated so as to establish charge neutrality from the molar ratio and valence of the elements included in A, B, and D.

**It is a content when the content of B in Chemical Formula (I) (La in Examples) is 100 mol %.

TABLE 3

| | Chemical composition ($A_\alpha B_\beta D_\gamma O_\omega$) (I)* | Co/B Molar ratio (%)** | Mn/B Molar ratio (%)** | Ni/B Molar ratio (%)** | Electron conductivity after storage test (S/cm) | Determination |
|---|---|---|---|---|---|---|
| Example 1C | Li6.7La3(Zr1.6Ta0.4Bi0.07)O12.2—0.0050Co | 0.17 | 0 | 0 | $3 \times 10^{-10}$ | ⊙ |
| Example 2C | Li6.8La3(Zr1.6Ta0.4Bi0.14)O12.4—0.0050Co | 0.17 | 0 | 0 | $1 \times 10^{-9}$ | ⊙ |
| Example 3C | Li6.7La3(Zr1.6Ta0.40Bi0.07)O12.2—0.0050Mn | 0 | 0.17 | 0 | $8 \times 10^{-10}$ | ⊙ |
| Example 4C | Li6.8La3(Zr1.7Ta0.30Bi0.07)O12.2—0.0050Mn | 0 | 0.17 | 0 | $8 \times 10^{-10}$ | ⊙ |

*Oxygen (O) in the chemical composition is a value calculated so as to establish charge neutrality from the molar ratio and valence of the elements included in A, B, and D.
**It is a content when the content of B in Chemical Formula (I) (La in Examples) is 100 mol %.

The following is apparent from Table 1.

As can be seen from Comparative Example 1, it is found that the electron conductivity of the Bi-substituted garnet-type solid electrolyte is rapidly increased when the storage test is performed at 90° C. with Li attached. This is considered to be because the Bi-substituted garnet-type solid electrolyte easily forms a Li—Bi—O-based compound as a heterogeneous phase at a grain boundary, and this Li—Bi—O-based compound is reduced by Li to exhibit electron conductivity.

From comparison between Comparative Example 1 and Examples 1A to 12A, it is found that when the Bi-substituted garnet-type solid electrolyte contains one or more transition metal elements selected from Co, Mn, and Ni, the electron conductivity after the storage test is significantly reduced. This is considered to be because the Bi-substituted garnet-type solid electrolyte contains one or more transition metal elements selected from Co, Mn, and Ni, thereby suppressing the generation of a Li—Bi—O-based compound that causes expression of electron conductivity.

From the above, when the Bi-substituted garnet-type solid electrolyte contains one or more transition metal elements selected from Co, Mn, and Ni, all all-solid-state battery having a small leakage current when being held at a high temperature can be constructed.

From comparison of Examples 1A to 6A, it is found that the leakage current after the storage test varies depending on the content of Co. It is found that the content of Co is preferably more than 0 mol % and 1.20 mol % or less and more preferably more than 0 mol % and 0.25 mol % or less. That is, it is found that the electron conductivity increases when the Co content is too large. This is considered to be because although the generation of the Li—Bi—O-based compound is suppressed as the Co content is increased, a heterogeneous phase having Li—La—Co—O-based electron conductivity is generated when the Co amount is excessively increased.

Also from the electron conductivity measurement before storage, since the electron conductivity before storage is enhanced when the amount of Co added is excessively increased, the total content of the transition metal elements is preferably more than 0 mol % and 1.20 mol % or less, more preferably more than 0 mol % and 0.50 mol % or less (for example, 0.01 mol % to 0.50 mol %), and still more preferably more than 0 mol % and 0.25 mol % or less (for example, 0.01 mol % to 0.20 mol %) when the content of the B is 100 mol %.

From comparison of Examples 4A to 12A, it is found that when the Bi-substituted garnet-type solid electrolyte contains Co among Ni, Mn, and Co, the effect of reducing the electron conductivity is particularly large.

The following is apparent from Table 2.

From Examples 3A and 1B to 3B, it is found that the Bi substitution amount in the garnet-type solid electrolyte affects the electron conductivity after the storage test. From the viewpoint of reducing the electron conductivity after the storage test, it is found that the Bi substitution amount is preferably small. It was found that the electron conductivity was significantly increased in Example 3B. This is considered to be because when the Bi substitution amount in the garnet-type solid electrolyte is excessively increased, not only a Li—Bi—O-based compound is easily produced, but also the garnet-type solid electrolyte itself is easily reductively decomposed.

The following is apparent from Table 3.

From Examples 1C to 4C, the effect of the present invention is obtained when γ in Formula (I) has various values.

Example 2: Bi Concentration Uniform Structure-Type and Bi Concentration Gradient Structure-Type Solid Electrolyte Ceramics

Example 1D and Comparative Example 2

Production of the Bi concentration uniform structure-type solid electrolyte ceramic and the solid electrolyte single plate, evaluation of the crystal structure and the chemical composition of the solid electrolyte single plate, and measurement of the electron conductivity and the ionic conductivity were performed by the same methods as in Example 1A, except that each starting material was weighed so as to have each chemical composition in Table 3.

In these Examples and Comparative Examples, it was confirmed that X-ray diffraction images capable of being assigned to a pseudo-garnet-type crystal structure were obtained from X-ray diffraction of the solid electrolyte single plate (ICDD Card No. 00-045-0109).

Example 2D and Comparative Example 3

Production of the solid electrolyte single plate, evaluation of the crystal structure and the chemical composition of the solid electrolyte single plate, and measurement of the electron conductivity and the ionic conductivity were performed by the same methods as in Example 1A, except that a Bi concentration gradient structure-type solid electrolyte ceramic produced by the following method was used.

In these Examples and Comparative Examples, it was confirmed that X-ray diffraction images capable of being assigned to a pseudo-garnet-type crystal structure were obtained as a ceramic single plate from X-ray diffraction of the solid electrolyte single plate (ICDD Card No. 00-045-0109). The Bi concentration gradient structure was confirmed by TEM-EDX.

[Production of Solid Electrolyte Ceramic Having Bi Concentration Gradient Structure]

Core particles and a shell layer for producing solid electrolyte ceramic having a Bi concentration gradient structure were produced.

(Production of Core Particles)

As core particles, a garnet-type solid electrolyte powder was produced as follows.

Lithium hydroxide monohydrate $LiOH \cdot H_2O$, lanthanum hydroxide $La(OH)_3$, zirconium oxide $ZrO_2$, tantalum oxide $Ta_2O_5$, bismuth oxide $Bi_2O_3$, cobalt oxide $Co_3O_4$ were used for raw materials.

Each raw material was weighed to have the chemical composition of $Li_{6.6}La_3(Zr_{1.6}Ta_{0.4})O_{12}$ in Comparative Example 3 and $Li_{6.6}La_3(Zr_{1.6}Ta_{0.4})O_{12}$-0.0050Co in Example 2D, water was added thereto, the resulting mixture was sealed in a 100 ml polyethylene pot and rotated at 150 rpm for 16 hours on a pot rack to mix the raw materials. Lithium hydroxide monohydrate $LiOH \cdot H_2O$ as a Li source was charged in an excess of 3 wt % with respect to the target composition in consideration of Li deficiency during sintering.

The obtained slurry was evaporated and dried, and then calcined at 900° C. for 5 hours to obtain a target phase.

The calcined powder obtained was, with the addition of a mixed solvent of toluene-acetone thereto, subjected to grinding for 6 hours in a planetary ball mill.

The ground powder was dried to obtain a solid electrolyte powder. The powder was confirmed to have no compositional deviation through ICP measurement. The average particle size of the core particles at this time was 150 nm.

In Examples and Comparative Examples, the primary particle size of the material was not changed, and the structure and composition were controlled by the composition, molar ratio, and firing time of the core phase and the shell phase.

[Production of Powder in which Core Particles are Coated with Shell Layer]

A powder in which core particles were coated with a garnet-type solid electrolyte as a shell layer was produced as follows.

As raw materials, lithium nitrate $LiNO_3$, lanthanum nitrate hexahydrate $La(NO_3)_3 \cdot 6H_2O$, bismuth nitrate pentahydrate $Bi(NO_3)_3 \cdot 5H_2O$, zirconium(IV) isopropoxide $Zr(OC_3H_7)_4$, tantalum(V) ethoxide $Ta(OC_2H_5)_5$, cobalt nitrate hexahydrate $Co(NO_3)_2 \cdot 6H_2O$) ethyl acetoacetate were used. Each material was weighed so as to satisfy the chemical composition of $Li_{6.0}La_3(Zr_{1.0}Ta_{0.4}Bi_{0.6})O_{12}$ in Comparative Example 3 and $Li_{6.0}La_3(Zr_{1.0}Ta_{0.4}Bi_{0.6})O_{12}$-0.0050Co in Example 2D. Ethyl acetoacetate was weighed to be 4 times the molar amount of each alkoxide. First, each alkoxide and ethyl acetoacetate were placed in a glass container and stirred for 30 minutes using a stirrer piece (solution A). Next, each nitrate and 2-methoxyethanol was placed in a glass container to dissolve the nitrate (solution B). The solution A was added dropwise little by little to the solution B to produce a uniform solution C. The predetermined core particles were mixed into the solution C and then mixed using a stirrer piece for 5 hours, and then the solvent was evaporated at 100° C. The obtained dry powder was subjected to a heat treatment at 700° C. for 5 hours to obtain a garnet-type solid electrolyte powder having a shell layer on core particles.

In addition, only the solution C was dried and then subjected to a heat treatment at 700° C. for 5 hours to obtain a shell layer powder.

It was confirmed that the garnet-type solid electrolyte single substance was obtained through XRD measurement of the shell layer powder. Further, it was confirmed that the powder had no compositional deviation in the shell layer through ICP measurement.

[Measurement]

(Bi Amount (x1) in Vicinity of Grain Boundaries)

The solid electrolyte single plate was processed into a thin piece by FIB treatment, and then quantitative analysis (composition analysis) was performed by point analysis at any 20 points in the vicinity of grain boundaries of each of any 10 sintered grains by EDX using energy dispersive X-ray spectroscopy (TEM-EDX) to obtain a Bi/D ratio in the vicinity of grain boundaries. The Bi amount x in Formula (I) was calculated from the Bi/D ratio in the vicinity of grain boundaries, and the amount was taken as the Bi amount (x1) of the vicinity of grain boundaries.

(Bi Amount (x2) in Grain Interior)

The solid electrolyte single plate was processed into a thin piece by FIB treatment, and then quantitative analysis (composition analysis) was performed by point analysis at any 20 points in the grain interior of each of any 10 sintered grains by EDX using energy dispersive X-ray spectroscopy (TEM-EDX) to obtain a Bi/D ratio in the grain interior. The Bi amount x in Formula (I) was calculated from the Bi/D ratio in the grain interior, and the amount was taken as the Bi amount (x2) of the vicinity of grain boundaries.

TABLE 4

| | Chemical composition ($A_\alpha B_\beta D_\gamma O_\omega$) (I)* | Co/B Molar ratio (%)** | Mn/B Molar ratio (%)** | Ni/B Molar ratio (%)** |
|---|---|---|---|---|
| Comparative Example 2 | Li6.5La3 (Zr1.46Ta0.4Bi0.14) O12 | 0 | 0 | 0 |
| Comparative Example 3 | Li6.5La3 (Zr1.46Ta0.4Bi0.14) O12 (Average composition after firing) | 0 | 0 | 0 |
| Example 1D | Li6.5La3 (Zr1.46Ta0.4Bi0.14)O12—0.0050Co | 0.17 | 0 | 0 |
| Example 2D | Li6.5La3 (Zr1.46Ta0.4Bi0.14)O12—0.0050Co (Average composition after firing) | 0.17 | 0 | 0 |

| | Bi amount in vicinity of grain boundaries (x1)*** | Bi amount in grain interior (x2)*** | Electron conductivity after storage test ( S/cm) | Determination | Improvement ratio (1) |
|---|---|---|---|---|---|
| Comparative Example 2 | 0.13 | 0.13 | $2 \times 10^{-6}$ | X | — |
| Comparative Example 3 | 0.48 | 0.08 | $3 \times 10^{-5}$ | X | — |

TABLE 4-continued

| | | | | | |
|---|---|---|---|---|---|
| Example 1D | 0.14 | 0.14 | $2 \times 10^{-9}$ | ⊙ | $1.0 \times 10^{3}$ |
| Example 2D | 0.40 | 0.12 | $6 \times 10^{-9}$ | ⊙ | $5.0 \times 10^{3}$ |

(1) Improvement ratio = (Co-free electron conductivity/Co-containing electron conductivity)

*Oxygen (O) in the chemical composition is a value calculated so as to establish charge neutrality from the molar ratio and valence of the elements included in A, B, and D.

**It is a content when the content of B in Chemical Formula (I) (La in Examples) is 100 mol %.

***Analyzed value by TEM In Example 2D, the ionic conductivity was $9 \times 10^{-4}$ S/cm (⊙).

The following is apparent from Table 3.

Although Comparative Examples 2 and 3 had the same average chemical composition, Comparative Example 3 showed the electron conductivity after the storage test of the garnet-type solid electrolyte in which the Bi substitution amount was increased in the vicinity of grain boundaries. From comparison between Comparative Example 2 and Comparative Example 3 and comparison between Example 1D and Example 2D, it is found that in the solid electrolyte in which the Bi substitution amount was increased in the vicinity of grain boundaries, the electron conductivity after the storage test is increased as compared with the solid electrolyte in which Bi is uniformly solid-solved. This is considered to be because the Bi substitution amount in the vicinity of grain boundaries is increased, so that a Li—Bi—O-based heterogeneous phase is more easily formed at the grain boundary. From comparison between Comparative Example 3 and Example 2D, it is found that when the solid electrolyte contains Co, the electron conductivity after the storage test is significantly improved also in the garnet-type solid electrolyte in which the Bi substitution amount was increased in the vicinity of grain boundaries. In the garnet-type solid electrolyte in which the Bi substitution amount was increased in the vicinity of grain boundaries (Example 2D), it is found that the effect obtained by containing Co is particularly large as compared with the solid electrolyte in which Bi is uniformly solid-solved (Comparative Example 2 and Example 1D). As described above, it is found that the effect of the present invention is particularly effective for a garnet-type solid electrolyte in which the Bi substitution amount was increased in the vicinity of grain boundaries.

(TEM-EELS Measurement)

The solid electrolyte used in Example 5A and lithium cobalt oxide $LiCoO_2$ were weighed at a volume ratio of 1:1 to prepare a mixed powder.

The obtained mixed powder was kneaded with a butyral resin, an alcohol, and a binder to produce a slurry.

The slurry was sheet-molded on a PET film using a doctor blade method to obtain a positive electrode sheet.

A solid electrolyte prepared in the same manner as in Example 5A was stacked to a thickness of 200 μm to prepare a solid electrolyte laminate. The prepared positive sheet was stacked so as to have a thickness of 30 μm to prepare a positive electrode laminate. The obtained solid electrolyte laminate and positive electrode laminate were stacked and then pressure-bonded to obtain a positive electrode/solid electrolyte sheet laminate. The sheet was cut into a square shape having a size of 10 mm×10 mm, the binder was removed at 400° C., and then the sheet was subjected to press sintering at 800° C. for 120 minutes under a pressure of 100 MPa to prepare a positive electrode/solid electrolyte co-fired body. A Li metal was attached to the surface of the obtained positive electrode/solid electrolyte co-fired body on a side opposite to the positive electrode to prepare a positive electrode half cell.

The positive electrode layer of the prepared positive electrode half cell was flaked by performing FIB treatment, and EELS measurement in the solid electrolyte particles in the positive electrode layer was performed using TEM (JEM-ARM200F NEOARMex manufactured by JEOL Ltd.) and EELS (Continuum ER manufactured by Gatan, Inc.). An EELS spectrum obtained by measuring the bulk particles in the solid electrolyte is shown in FIG. 2. A peak derived from the L end of Co was detected, and it was found that Co was contained in the solid electrolyte particles. It was found that the peak position (LLZ) was observed on the lower energy side as compared with the peak position of $LiCoO_2$ (lithium cobalt oxide) (LCO) of the reference material. For Example 5A, the shift width sw (see FIG. 2) between the Co L-end peak position in the solid electrolyte ceramic (LLZ) of the present invention and the Co L-end peak position of $LiCoO_2$ (LCO) was 0.9 eV.

As a quantitative method, the first-order derivative peak intensity of the obtained EELS spectrum was used. Specifically, the maximum value $I_{max}$ and the minimum value $I_{min}$ were read from the Co L-end and La M-end peaks in the first-order derivative spectrum, a difference ($I_{max}-I_{min}$) therebetween was defined as a peak intensity, and the Co L-end peak intensity was divided by the peak intensity of the La M-end to calculate the Co/La ratio. In this way, EELS measurement was performed at arbitrary five points in the solid electrolyte particles, the Co/La ratio was calculated for each point, and the values were averaged to obtain the Co/La ratio. As a result, the Co/La ratio was 0.8%, and it was found that the Co/La ratio takes a value similar to the measured value in ICP.

The solid-state battery including the solid electrolyte ceramic of the present invention can be used in various fields where battery use or power storage is assumed. Although it is merely an example, the solid-state battery according to an embodiment of the present invention can be used in the field of electronics mounting. The solid-state battery according to an embodiment of the present invention can also be used in the fields of electricity, information, and communication in which mobile devices and the like are used (for example, electric and electronic equipment fields or mobile equipment fields including mobile phones, smartphones, smartwatches, notebook computers, and small electronic machines such as digital cameras, activity meters, arm computers, electronic papers, wearable devices, RFID tags, card-type electronic money, and smartwatches), home and small industrial applications (for example, the fields of electric tools, golf carts, and home, nursing, and industrial robots), large industrial applications (for example, the fields of forklift, elevator, and harbor crane), transportation system fields (for example, the fields of hybrid vehicles, electric vehicles, buses, trains, power-assisted bicycles, electric two-wheeled vehicles, and the like), power system applications (for example, fields such as various types of power generation, road conditioners, smart grids, and household power storage systems), medical applications (medical device fields such as hearing aid buds), pharmaceutical applications (fields such as dosage management systems), IoT fields, space and deep sea applications (for example, fields such as space probes and submersibles), and the like.

The invention claimed is:

1. A solid electrolyte ceramic having a garnet-type crystal structure, the solid electrolyte ceramic comprising:

at least Li, La, D, and O; and one or more transition metal elements selected from the group consisting of Co, Ni, and Mn, wherein the D is one or more elements selected from the group consisting of a transition element capable of providing six-coordination with oxygen and an element belonging to Groups 12 to 15, and includes at least Bi, and wherein a content of the Bi is more than 0 mol % and 25 mol % or less when a content of the D is 100 mol %.

2. The solid electrolyte ceramic according to claim 1, wherein the solid electrolyte ceramic has a chemical composition represented by:

$$A_\alpha B_\beta D_\gamma O_\omega \quad (I)$$

wherein A is one or more elements selected from the group consisting of the Li, Ga, Al, Mg, Zn, and Sc, and includes at least the Li;

B is one or more elements selected from the group consisting of La, Ca, Sr, Ba, and lanthanoid elements, and includes at least the La;

the D includes at least Zr, Ta, and the Bi;

$$50 \leq \alpha \leq 80;$$

$$2.5 \leq \beta \leq 35;$$

$$1.5 \leq \gamma \leq 2.5; \text{ and}$$

$$11 \leq \omega \leq 13.$$

3. The solid electrolyte ceramic according to claim 2, wherein:

$$5.5 \leq \alpha \leq 7.0$$

$$2.5 \leq \beta \leq 33;$$

$$1.8 \leq \gamma \leq 2.5; \text{ and}$$

$$11 \leq \omega \leq 12.5.$$

4. The solid electrolyte ceramic according to claim 2, wherein the chemical composition of the solid electrolyte ceramic is at least one of:

$Li_{6.3}La_3$ $(Zr_{1.30}Ta_{0.40}Bi_{0.30})$ $O_{12}$-0.001Co;
$Li_{6.3}La_3$ $(Zr_{1.30}Ta_{0.40}Bi_{0.30})$ $O_{12}$-0.003Co;
$Li_{6.3}La_3$ $(Zr_{1.30}Ta_{0.40}Bi_{0.30})$ $O_{12}$-0.005Co;
$Li_{6.3}La_3$ $(Zr_{1.30}Ta_{0.40}Bi_{0.30})$ $O_{12}$-0.010Co;
$Li_{6.3}La_3$ $(Zr_{1.30}Ta_{0.40}Bi_{0.30})$ $O_{12}$-0.025Co;
$Li_{6.3}La_3$ $(Zr_{1.30}Ta_{0.40}Bi_{0.30})$ $O_{12}$-0.050Co;
$Li_{6.3}La_3$ $(Zr_{1.30}Ta_{0.40}Bi_{0.30})$ $O_{12}$-0.001Mn;
$Li_{6.3}La_3$ $(Zr_{1.30}Ta_{0.40}Bi_{0.30})$ $O_{12}$-0.005Mn;
$Li_{6.3}La_3$ $(Zr_{1.30}Ta_{0.40}Bi_{0.30})$ $O_{12}$-0.010Mn;
$Li_{6.3}La_3$ $(Zr_{1.30}Ta_{0.40}Bi_{0.30})$ $O_{12}$-0.001Ni;
$Li_{6.3}La_3$ $(Zr_{1.30}Ta_{0.40}Bi_{0.30})$ $O_{12}$-0.005Ni;
$Li_{6.3}La_3$ $(Zr_{1.30}Ta_{0.40}Bi_{0.30})$ $O_{12}$-0.010Ni;
$Li_{6.3}La_3$ $(Zr_{1.30}Ta_{0.40}Bi_{0.30})$ $O_{12}$-0.005Co-0.005Ni-0.005Mn;
$Li_{6.5}La_3$ $(Zr_{1.53}Ta_{0.4}Bi_{0.07})$ $O_{12}$-0.005Co;
$Li_{6.5}La_3$ $(Zr_{1.46}Ta_{0.4}Bi_{0.14})$ $O_{12}$-0.005Co;
$Li_{6.3}La_3$ $(Zr_{1.30}Ta_{0.40}Bi_{0.30})$ $O_{12}$-0.005Co; and
$Li_{6.1}La_3$ $(Zr_{1.10}Ta_{0.40}Bi_{0.50})$ $O_{12}$-0.005Co.

5. The solid electrolyte ceramic according to claim 2, wherein a total content of the one or more transition metal elements is more than 0 mol % and 3.50 mol % or less when a content of the B is 100 mol %.

6. The solid electrolyte ceramic according to claim 2, wherein a total content of the one or more transition metal elements is more than 0 mol % and 1.20 mol % or less when a content of the B is 100 mol %.

7. The solid electrolyte ceramic according to claim 2, wherein a total content of the one or more transition metal elements is more than 0 mol % and 0.25 mol % or less when a content of the B is 100 mol %.

8. The solid electrolyte ceramic according to claim 1, wherein the one or more transition metal elements include Co.

9. A solid electrolyte ceramic having a garnet-type crystal structure, the solid electrolyte ceramic comprising:

at least Li, La, Bi, and O; and one or more transition metal elements selected from the group consisting of Co, Ni, and Mn, wherein the solid electrolyte ceramic has a chemical composition represented by:

$$A_\alpha B_\beta D_\gamma O_\omega \quad (I)$$

wherein A is one or more elements selected from the group consisting of the Li, Ga, Al, Mg, Zn, and Sc, and includes at least the Li;

B is one or more elements selected from the group consisting of La, Ca, Sr, Ba, and lanthanoid elements, and includes at least the La;

D is one or more elements selected from the group consisting of a transition element capable of providing six-coordination with oxygen and an element belonging to Groups 12 to 15, and includes at least the Bi;

$$5.0 \leq \alpha \leq 80;$$

$$2.5 \leq \beta \leq 35;$$

$$1.5 \leq \gamma \leq 25; \text{ and}$$

$$11 \leq \omega \leq 13, \text{ and}$$

wherein a Bi concentration in a vicinity of grain boundaries is higher than a Bi concentration in a grain interior.

10. The solid electrolyte ceramic according to claim 9, wherein, when twice an amount of a molar ratio of the Bi in the D in the garnet-type crystal structure is defined as a Bi amount x, the Bi satisfies:

$$x_2 < x_1$$

where $x_1$ is the Bi amount x in the vicinity of the grain boundaries and $x_2$ is the Bi amount x in the grain interior.

11. The solid electrolyte ceramic according to claim 10, wherein:

$$0 < x_1 \leq 0.80; \text{ and}$$

$$0 \leq x_2 \leq 0.30.$$

12. The solid electrolyte ceramic according to claim 10, wherein $0.01 \leq x_1 - x_2$.

13. The solid electrolyte ceramic according to claim 1, wherein a peak position of a Co L end is lower than a peak position of a Co L end in $LiCoO_2$ in an electron energy loss spectroscopic spectrum of the solid electrolyte ceramic.

14. A solid-state battery comprising the solid electrolyte ceramic according to claim 1.

15. The solid-state battery according to claim 14, wherein the solid-state battery includes a positive electrode layer, a negative electrode layer, and a solid electrolyte layer between the positive electrode layer and the negative electrode layer, and the positive electrode layer and the negative electrode layer are layers capable of occluding and releasing lithium ions.

16. The solid-state battery according to claim 15, wherein the solid electrolyte layer and the positive electrode layer, and the solid electrolyte layer and the negative electrode layer are integrally sintered bodies.

17. The solid-state battery according to claim 14, wherein the solid electrolyte ceramic is in the solid electrolyte layer of the solid-state battery.

* * * * *